(12) United States Patent
Ishibashi et al.

(10) Patent No.: US 11,425,264 B2
(45) Date of Patent: Aug. 23, 2022

(54) IMAGE READING APPARATUS, IMAGE READING SYSTEM, AND IMAGE READING METHOD

(71) Applicant: SEIKO EPSON CORPORATION, Tokyo (JP)

(72) Inventors: Sota Ishibashi, Kurume (JP); Masaya Kobayashi, Umi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/215,559

(22) Filed: Mar. 29, 2021

(65) Prior Publication Data

US 2021/0306468 A1 Sep. 30, 2021

(30) Foreign Application Priority Data

Mar. 30, 2020 (JP) .............................. JP2020-060143

(51) Int. Cl.
*H04N 1/00* (2006.01)
*H04N 1/32* (2006.01)
*H04N 1/41* (2006.01)

(52) U.S. Cl.
CPC ....... *H04N 1/0001* (2013.01); *H04N 1/00013* (2013.01); *H04N 1/00029* (2013.01); *H04N 1/00068* (2013.01); *H04N 1/00074* (2013.01); *H04N 1/00408* (2013.01); *H04N 1/32614* (2013.01); *H04N 1/32641* (2013.01); *H04N 1/32646* (2013.01); *H04N 1/41* (2013.01)

(58) Field of Classification Search
CPC ...................................................... H04N 1/0001
USPC ...................................................... 358/1.14
See application file for complete search history.

(56) References Cited

U.S. PATENT DOCUMENTS 6,184,999 B1 * 2/2001 Yoshida ................... H04N 1/41
358/1.6

FOREIGN PATENT DOCUMENTS

JP 2006-165698 6/2006

* cited by examiner

*Primary Examiner* — Jacky X Zheng
(74) *Attorney, Agent, or Firm* — Workman Nydegger

(57) ABSTRACT

An image reading apparatus is configured to be connected to an external terminal via a network. The image reading apparatus includes a transmitter, a reading section, and a controller. The controller executes an image generation process of generating a single first image file from image data of a document read by the reading section and causes the transmitter to transfer the first image file to the external terminal connected via the network. The controller executes a compression rate determination process of determining a compression rate of a second image file in the image generation process based on a transfer rate of the network when the first image file is transferred to the external terminal and a reading rate of the reading section.

13 Claims, 11 Drawing Sheets

IMAGE READING APPARATUS, IMAGE READING SYSTEM, AND IMAGE READING METHOD

The present application is based on, and claims priority from JP Application Serial Number 2020-060143, filed Mar. 30, 2020, the disclosure of which is hereby incorporated by reference herein in its entirety.

BACKGROUND

1. Technical Field

The present disclosure relates to an image reading apparatus, an image reading system, and an image reading method for reading an image from a document.

2. Related Art

JP-A-2006-165698 discloses an image reading apparatus connected to an output device as an example of an output destination of an external terminal connected to a network. A reading rate of a reading unit as an example of a reading section and the effective rate of the network as an example of a transfer rate to the output destination of the external terminal are compared to each other. When the effective rate of the network is slower than the reading rate of the reading unit of the image reading apparatus, the image size of an image file is automatically reduced by lowering the reading resolution by the reading section.

In the related art, when image files of a plurality of documents read by an image reading apparatus are transferred to a cloud or the external terminal via the network, depending on a load status of network traffic, a transfer rate to the output destination of the external terminal may be slower than the reading rate of the reading section in the image reading apparatus, and thus a reading process in the image reading apparatus may be temporarily interrupted.

However, in the image reading apparatus disclosed in JP-A-2006-165698, when the reading rate of the reading section is slower than the transfer rate to the output destination of the external terminal, the image size of the image file is reduced by lowering the reading resolution by the reading section, and the reading time by the reading section is reduced. In this manner, the reading rate of the reading section is increased. Therefore, there is a problem that the image quality of the transferred image file deteriorates.

SUMMARY

To solve the above problems, an image reading apparatus is configured to be connected to an external terminal via a network. The image reading apparatus includes a transmitter that transfers data to the external terminal, a reading section that reads a document, and a controller that executes an image generation process of generating a single first image file from image data of the document read by the reading section, and causes the transmitter to transfer the first image file to the external terminal connected via the network. The controller executes a compression rate determination process of determining a compression rate of a second image file in the image generation process, based on a transfer rate of the network when the first image file is transferred to the external terminal and a reading rate of the reading section.

To solve the above problems, an image reading system includes an image reading apparatus that executes an image generation process of generating a single first image file by reading a document, and an external terminal connected to the image reading apparatus via a network. A compression rate determination process of determining a compression rate of a second image file in the image generation process, based on a transfer rate of the network when the first image file is transferred to the external terminal, and a reading rate of a reading section.

To solve the above problems, there is provided an image reading method of an image reading apparatus including a reading section that reads a document, a transmitter that transfers data to an external terminal connected via a network, and a controller that controls the reading section and the transmitter. The image reading method includes an image generation process step of generating a single first image file from image data obtained by the reading section reading a document, a transfer step of transferring the first image file to the external terminal connected via the network by the transmitter, and a compression rate determination process step of determining a compression rate of a second image file in the image generation process step based on a transfer rate of the network when the first image file is transferred to the external terminal and a reading rate of the reading section.

DESCRIPTION OF EXEMPLARY EMBODIMENTS

Figure 1:
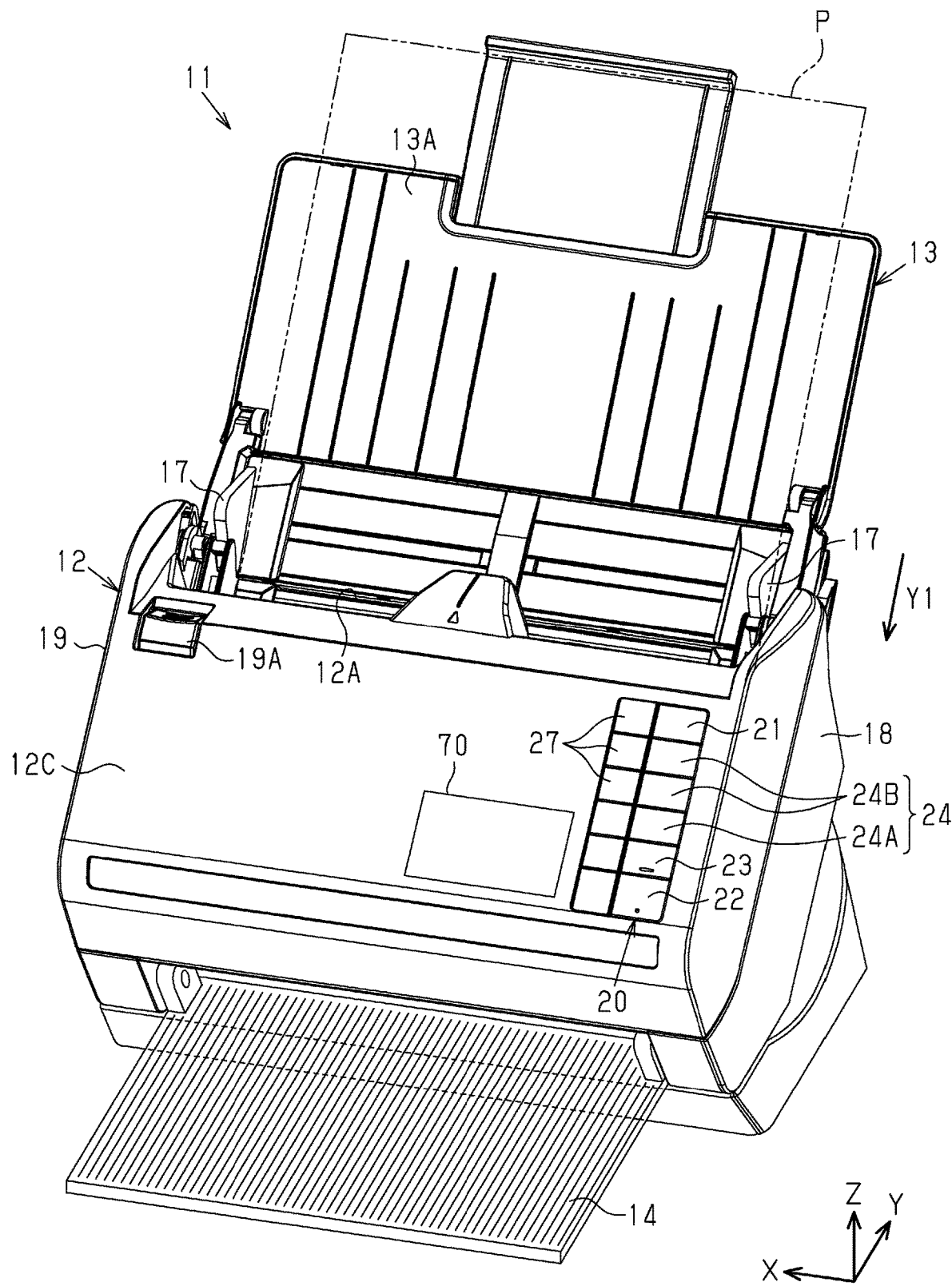
FIG. 1 is a perspective view illustrating an image reading apparatus according to first and second embodiments.

In the drawings, assuming that an image reading apparatus 11 is disposed on a horizontal plane, the direction of gravity is indicated by a Z-axis, and directions along a plane intersecting with the Z-axis indicate an X-axis and a Y-axis. The X-axis, the Y-axis, and the Z-axis are preferably orthogonal to each other, and the X-axis and Y-axis are along the horizontal plane. In the following description, an X-axis direction is referred to as a width direction X, a Y-axis direction is referred to as a depth direction Y, and a Z-axis direction is referred to as a vertical direction Z. A direction in which the document is transported during reading is also referred to as a transport direction Y1.

First Embodiment

Hereinafter, an image reading apparatus 11 according to a first embodiment will be described with reference to the drawings.

Configuration of Image Reading Apparatus and Image Reading System

As illustrated in FIG. 1, the image reading apparatus 11 includes a main body 12, a feeding tray 13, and a discharge tray 14. The feeding tray has a placing surface 13A on which a document P being an image reading target is placed. The discharge tray discharges the document P of which reading is ended. The document P placed on the feeding tray 13 is fed one by one into the main body 12 from a feeding port 12A that is opened at an upper portion of the main body 12.

A pair of edge guides 17 is provided in the feeding tray 13. The pair of edge guides are capable of sliding in the width direction X intersecting with the transport direction Y1 in which the document P is transported. The document P loaded on the placing surface 13A is positioned in the width direction X with respect to the feeding port 12A by being held between the pair of edge guides 17.

The main body 12 includes a base portion 18 and a cover portion 19 that is joined to be rotatable around a front end portion of the base portion 18. When a user operates an opening/closing lever 19A to release the lock of the cover portion 19, and to rotate the cover portion 19 from the closed position illustrated in FIG. 1 to an open position toward the front side of a paper surface of FIG. 1 around the front end portion thereof, a transport path is exposed, and, for example, clogging of the document P is released.

As illustrated in FIG. 1, an operation section 20 is provided on the front surface portion 12C of the main body 12. The operation section 20 includes a plurality of operation switches 21 to 25 operated by the user when the user issues an instruction to the image reading apparatus 11. Specifically, the operation section 20 includes a power switch 21, a start switch 22, a stop switch 23, and an input section 24. The input section 24 includes a processing mode selection switch 24A and a setting change switch 24B. A notification section 27 is provided at a position adjacent to the operation section 20. For example, the notification section includes an indicator that enables at least one of turn-on and blinking and turn-off by an LED, or is capable of changing the lighting color during lighting.

The notification section 27 transmits a notification of information necessary for the user, for example, information on power on or off, or the currently-selected mode, by turning on or off or changing the lighting color. A display section 70 configured by a liquid crystal panel is provided on the front surface portion 12C of the main body 12 to display necessary information to the user and the administrator.

Figure 2:
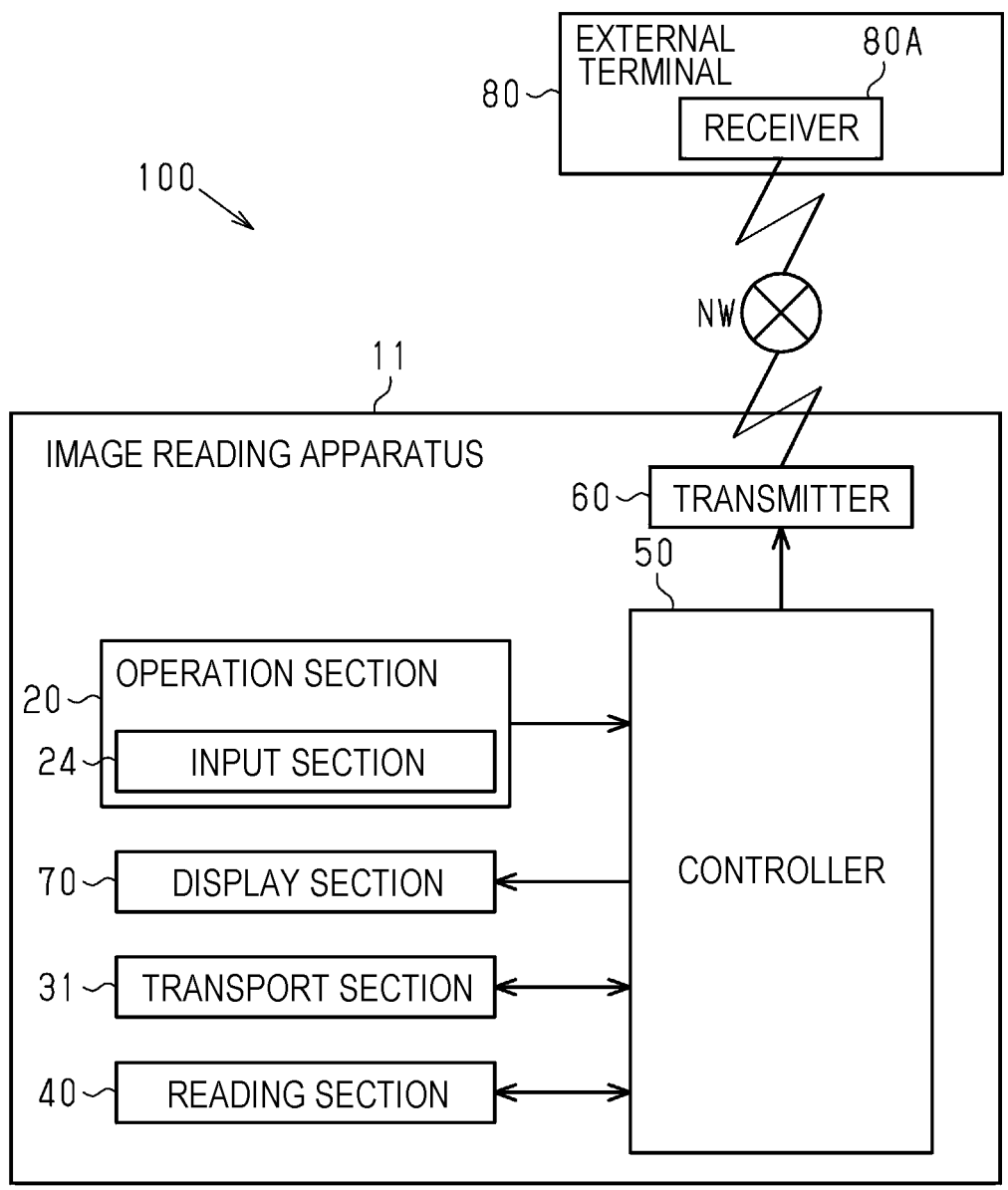
FIG. 2 is a block diagram illustrating an image reading system in the first and second embodiments.

As illustrated in FIG. 2, an image reading system 100 includes the image reading apparatus 11 and an external terminal 80. The image reading apparatus 11 includes a transmitter 60 that transfers data to the external terminal 80, the operation section 20 that includes an input section 24, the display section 70, a transport section 31, a reading section 40 that reads the document P, and a controller 50 that controls the reading section 40 and the transmitter 60. The external terminal 80 includes a receiver 80A. The transmitter 60 of the image reading apparatus 11 and the receiver 80A of the external terminal 80 are configured to be connected to each other via a network NW. The image reading system 100 is configured to be capable of transferring data from the transmitter 60 to the receiver 80A.

Overall Flow of Image Transfer Process

Firstly, an outline of the entirety of an image transfer process will be described.

Figure 4:
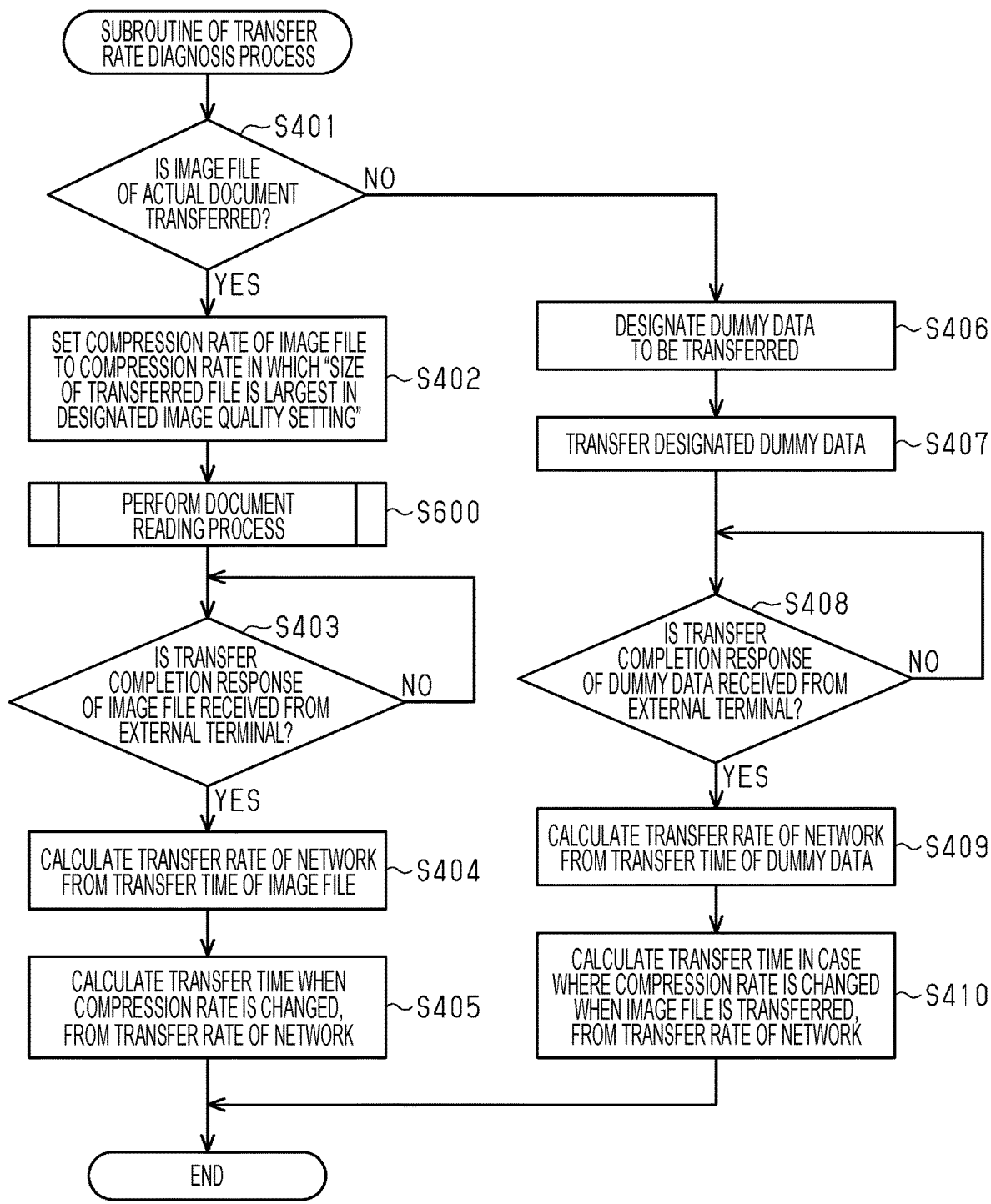
FIG. 4 is a flowchart illustrating a transfer rate diagnosis process in the first embodiment.

In the first embodiment, the controller 50 illustrated in FIG. 2 executes a transfer rate diagnosis process illustrated in FIG. 4. In the transfer rate diagnosis process, an image quality setting and an output destination are designated, and the transfer rate of the network NW illustrated in FIG. 2 to the external terminal 80 is calculated based on a transfer time when the transmitter 60 illustrated in FIG. 2 transfers a first image file to the external terminal 80 including the output destination.

The controller 50 illustrated in FIG. 2 executes a compression rate determination process (illustrated in FIG. 5) of determining a compression rate of a second image file in an image generation process based on the transfer rate of the network NW when the first image file is transferred to the external terminal 80 and a reading rate of the reading section 40 illustrated in FIG. 2.

Next, the image transfer process executed by the controller 50 illustrated in FIG. 2 will be described with reference to the flowcharts illustrated in FIGS. 3 to 6. Firstly, the entire routine of the image transfer process in the first embodiment will be described with reference to the flowchart illustrated in FIG. 3.

In Step S301, the controller 50 illustrated in FIG. 2 determines whether or not an input to use preset data as job setting of the image transfer process to be executed is received from the input section 24 operated by the user. The job setting refers to designation of an image quality setting and the output destination. The preset data is configured by the job setting and the compression rate of an image file.

Figure 5:
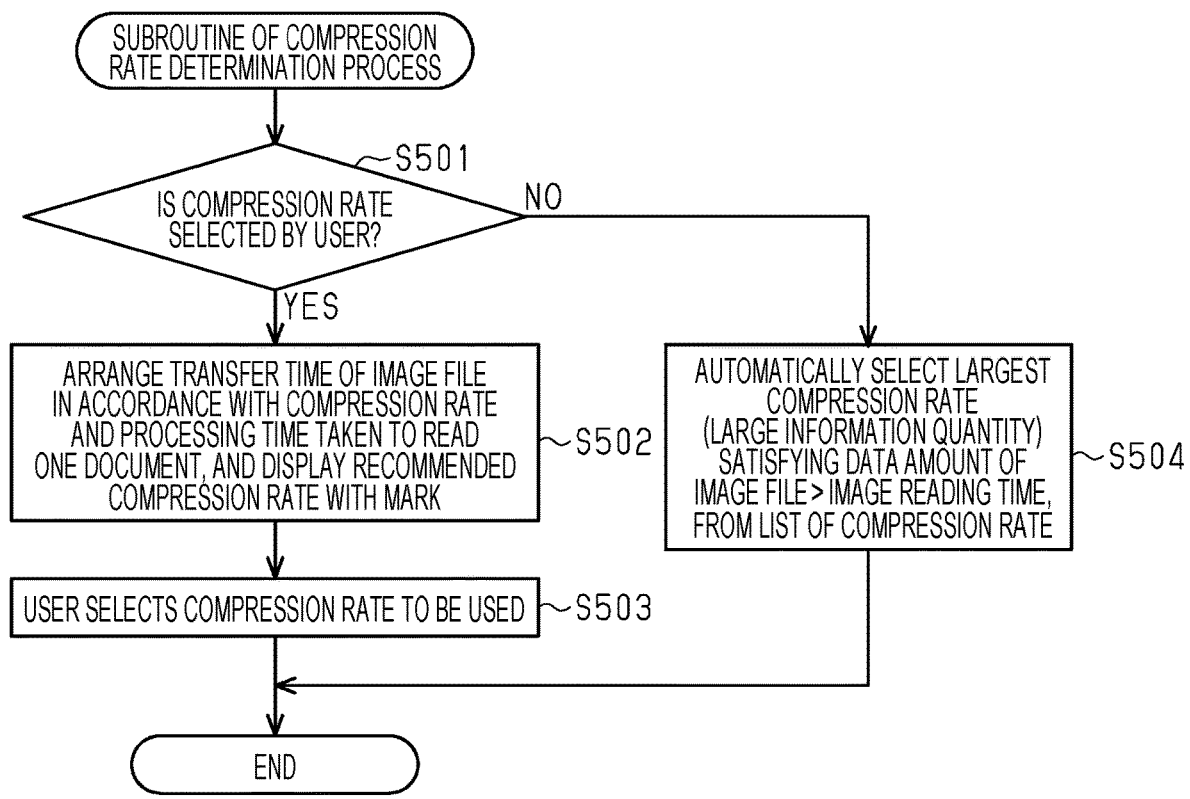
FIG. 5 is a flowchart illustrating a compression rate determination process in the first embodiment.

The input section 24 illustrated in FIG. 1 has a configuration of allowing the user to select whether an image is transferred by using a record of the previous transfer rate to omit the measurement of the transfer rate, which is a pre-process of the transfer process, or the image is transferred after the current transfer rate is measured. To be more accurate, the input section 24 has a configuration of allowing the selection of whether the compression rate is designated to execute the image generation process (which is illustrated in Step S604 of FIG. 6 and will be described later), or the transfer rate diagnosis process (which is illustrated in FIG. 4 and will be described later) and the compression rate determination process (which is illustrated in FIG. 5 and will be described later) are executed.

Regarding the image quality setting, how the document P is read and what type of file the document P is generated from are designated. Specifically, the user designates, with the input section 24, whether the document is a single-sided document or a double-sided document, whether the document is a color document or a black-and-white document, the size of the document, the reading resolution, the type of file to be generated, and the like. Regarding the reading resolution, the highest resolution allowing reading of the reading section 40 illustrated in FIG. 2 is generally designated. The type of file to be generated includes an image file format such as jpeg, pdf, and tiff that allows compression of data, and the type of file is selected in accordance with the purpose.

The output destination refers to a disk of the external terminal 80 on the network NW illustrated in FIG. 2. That is, the output destination refers to an external storage device and a storage place for sharing data. There are two types of disks in the external terminal 80. One is an external terminal 80 at a known location on the network NW, which is a folder on the disk of a physical server. For example, there is a shared server of the corporate network, and the user designates the folder of the shared server as the output destination, with the input section 24. The other is a cloud on the network NW. The cloud is a virtual server on the Internet, that is virtually constructed as one server by combining a plurality of servers into one. For example, the user designates the contracted cloud account and address as the output destination.

The preset data is data of a combination of an image quality setting and an output destination prepared in advance in the image reading apparatus 11 illustrated in FIG. 1 as a job setting. When a job setting suitable for the purpose of the user is in the list of preset data shown on the display section 70 illustrated in FIG. 1, and an input to use the preset data as the job setting is received from the input section 24 operated by the user, the controller 50 determines Step S301 to be YES, and the process proceeds to Step S302.

Figure 6:
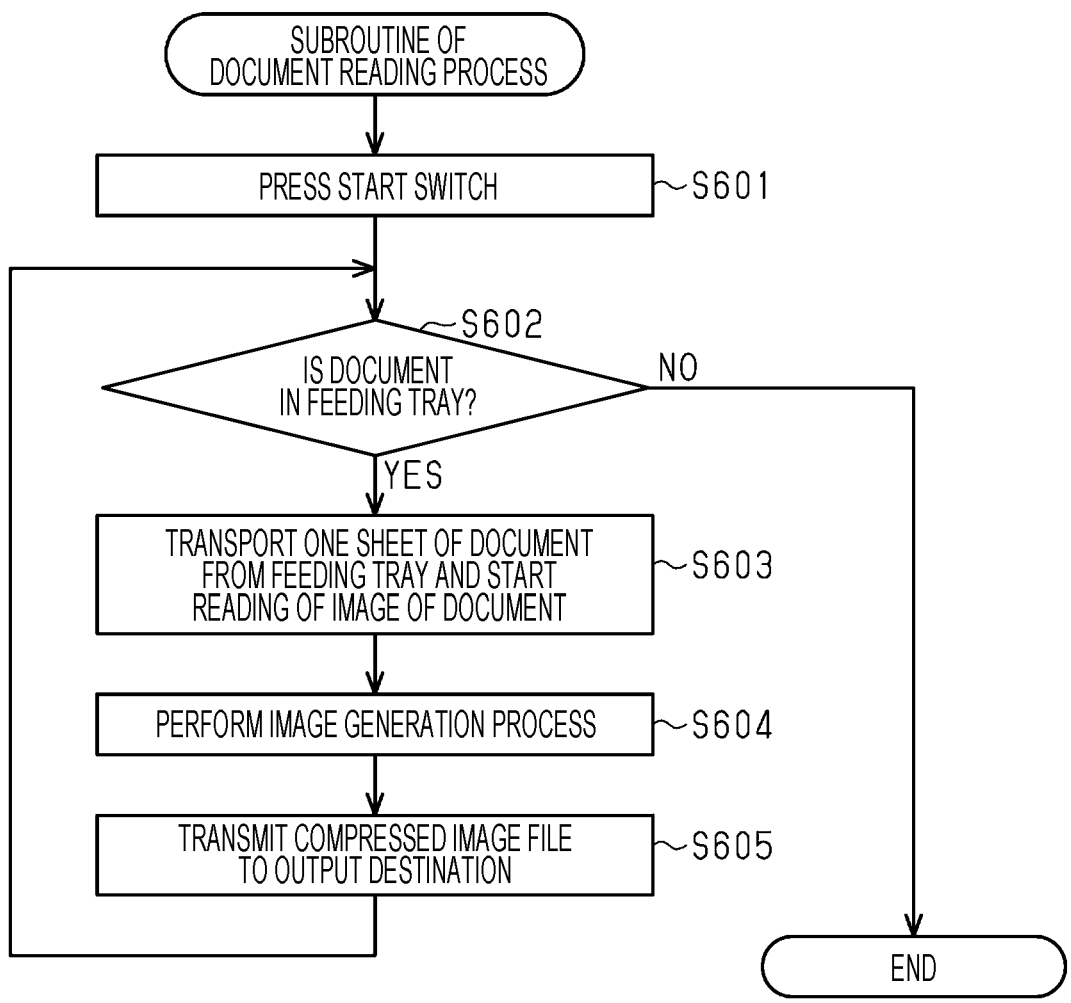
FIG. 6 is a flowchart illustrating a document reading process in the first embodiment.

In Step S302, when receiving, from the input section 24, an input indicating that the user selects the job setting from the list of the preset data, the controller 50 causes the process to proceed to a document reading process of Step S600 illustrated in FIG. 6. The preset data has a configuration with the compression rate. Thus, the compression rate is also designated when the user selects the job setting from the list of the preset data. That is, the compression rate is also included in the job setting.

In Step S301, when there is no job setting suitable for the purpose of the user in the list of preset data, or when no job setting is registered, Step S301 becomes NO, and the process proceeds to Step S303. Since no job setting is registered even when the user performs the operation for the first time, the process proceeds to Step S303.

In Step S303, when the user designates the image quality setting and the output destination with the input section 24 illustrated in FIG. 2, the display section 70 illustrated in FIG. 1 displays the compression rate to be used for the image generation process described later. That is, the display section 70 illustrated in FIG. 1 displays the compression rate to be used for the image generation process when the image quality setting and the output destination are designated. The image quality setting and the output destination are used in the transfer rate diagnosis process, which is the next Step S400. Here, the user may input the number of documents per job. By inputting the number of documents per job, it is possible to easily calculate the time required for each document by dividing the transfer time by the number of documents in the transfer rate diagnosis process described later. It is not essential to input the number of documents per job. The number of documents may be counted by a feeding sensor (not illustrated) of the image reading apparatus 11.

In the next Step S400, the controller 50 executes the subroutine of the transfer rate diagnosis process illustrated in FIG. 4. The subroutine of transfer rate diagnosis process will be described later. When the diagnosis of the transfer rate is completed, the process proceeds to Step S500.

In Step S500, the controller 50 executes the subroutine of the compression rate determination process illustrated in FIG. 5. The subroutine of the compression rate determination process will also be described later. When the compression rate is determined, the process proceeds to Step S600.

In Step S600, the controller 50 executes the subroutine of the document reading process illustrated in FIG. 6. The subroutine of the document reading process will also be described later. When the document reading process is ended, the process proceeds to Step S304.

In Step S304, the controller 50 illustrated in FIG. 2 causes the display section 70 illustrated in FIG. 1 to display the image quality of the reading result and determines whether or not the image quality of the reading result is OK. That is, when an image file is transferred to the designated output destination at the compression rate determined by the compression rate determination process described later, the display section 70 illustrated in FIG. 1 displays an image allowing recognition of the compression rate and the image quality of the image file. The user checks the image quality of the reading result on the display section 70 illustrated in FIG. 1.

For example, when checking the image quality of the reading result on the display section 70 illustrated in FIG. 1, the user selects an image intended to check the image quality from a plurality of transferred images, with the input section 24. Although the display area of the input section 24 is small, the display area is enlarged to a level at which each pixel of the selected image is allowed to be checked. The user is capable of checking the image quality of the read image file by moving, with the operation section 20 illustrated in FIG. 2, the position of the pixel displayed on the display section 70 illustrated in FIG. 2 up and down and left and right.

When the user determines that there is no problem with the image quality and the user performs an OK operation by operating the input section 24, the determination result in Step S304 becomes YES, and the process proceeds to Step S305. When the user determines that there is a problem with the image quality and the user performs an NG operation by operating the input section 24, the determination result in Step S304 becomes NO, and the process proceeds to Step S500. The compression rate determination process illustrated in FIG. 5 is performed again.

In Step S305, the controller 50 determines whether or not the user selected to store the previously-executed job setting as new preset data by the operation of the input section 24. Assuming that a similar job will be performed in the future, generally, the user selects to store the job setting as new preset data by operating the input section 24 while looking at the display section 70 illustrated in FIG. 1. When the controller 50 receives an input to store this job setting as new preset data, the controller 50 causes the process to proceed to Step S306. The controller 50 stores the previously-executed job setting, as new preset data. When the memory of the image reading apparatus is full, or when it is clear that the job setting is not repeated, the user selects NO with the input section 24 while looking at the display section 70 illustrated in FIG. 1. When the controller 50 receives the input of NO from the input section 24, the controller 50 ends the image transfer process.

The user may store the previously-executed job setting itself as new preset data. When the known preset data is used and the compression rate in the known preset data is changed to the compression rate determined in the compression rate determination process in Step S500 described later, the user may change the compression rate in the known preset data and update the job setting of the known preset data. The new stored preset data and the known preset data in which the job setting is updated can be selected as job settings at the next image transfer process.

In Step S306, the controller 50 performs a process of adding the present job setting to the preset data. Then, the controller 50 illustrated in FIG. 2 ends the image transfer process.

In the first embodiment, the image reading apparatus 11 includes the display section and the input section. The image reading system 100 may include a PC (not illustrated) and the PC may be connected to the image reading apparatus 11 and include the display section and the input section.

Flow of Transfer Rate Diagnosis Process

Next, the subroutine of the transfer rate diagnosis process in the first embodiment will be described with reference to the flowchart illustrated in FIG. 4. In the transfer rate diagnosis process, the controller 50 illustrated in FIG. 2 calculates the transfer rate of the network NW to the external terminal 80 based on the transfer time measured when the transmitter transfers an image file to the external terminal 80 including the output destination designated in Step S303 with the image quality setting designated in Step S303. Then, in this routine, the transfer time when the image size increases or decreases by changing the compression rate of the image file is calculated from the transfer rate of the network NW. The transfer rate diagnosis process is a process for obtaining a diagnostic result as a determination material when the compression rate is determined in the subsequent compression rate determination process.

In Step S401, the controller 50 determines whether to transfer the actual image file or the dummy data before measuring the transfer rate of the network NW. In Step S401, the user or the administrator may set information on the above determination as an initial setting in advance when the image reading apparatus 11 is installed, or the user may input and determine the information on the above determination with the input section 24 illustrated in FIG. 1. When the controller 50 transfers the actual image file, the determination result in Step S401 becomes YES, and the process proceeds to Step S402. When the controller 50 transfers dummy data, the determination result in Step S401 becomes NO, and the process proceeds to Step S406.

In Step S402, the controller 50 sets a compression rate having the largest transfer size in the designated image quality setting, as the compression rate when the image file is transferred, in the transfer rate diagnosis process. In the transfer rate diagnosis process, since the purpose is to measure the transfer rate of the network NW, the user does not need to prepare a large number of documents, nor need to prepare an actual document. The controller 50 illustrated in FIG. 2 makes it easy to determine the upper limit of the transfer rate of the network NW by increasing the transfer size and applying a load to the network NW.

The size of an image file at the compression rate in which the transfer size is the largest differs depending on the type of image file format set in the image quality setting. The available compression rate differs depending on the set image file format. The compression rate that is selectable by the user also differs depending on the algorithm of image compression of the controller 50 illustrated in FIG. 2. The controller 50 illustrated in FIG. 2 sets a compression rate having the largest transfer size in the designated image quality setting, as the compression rate when the image file is transferred, in the transfer rate diagnosis process. Then, the process proceeds from Step S402 to Step S600.

In Step S600, the controller 50 executes the subroutine of the document reading process illustrated in FIG. 6. The subroutine of the document reading process will be described later. When the document reading process is ended, the process proceeds from Step S600 to Step S403.

In Step S403, when the controller 50 receives a transfer completion response of the image file from the external terminal 80, the controller 50 causes the process to proceed to Step S404.

In Step S404, the controller 50 compares the reading time of one document with the transfer time of the network NW per document. The reading time of one document is determined by the transport rate of the image reading apparatus 11 when reading the document and the length of the document in the transport direction. That is, the reading time of one document does not depend on the amount of image data of the document, but is determined by condition of the image reading apparatus 11. The controller 50 illustrated in FIG. 2 calculates the reading time of one document and compares the calculated reading time with the transfer time of the network NW per document.

When the transfer time of the image file of one document becomes longer than the reading time of one document by increasing the compression rate when the image file is transferred, a waiting time is provided between the documents. Even at this time, the controller 50 illustrated in FIG. 2 can calculate the transfer time of the network NW per document. The controller 50 illustrated in FIG. 2 calculates the transfer time of the network NW per document.

In the next Step S405, the controller 50 changes the data transfer amount in several steps in a direction of decreasing the compression rate of the image file, and calculates the transfer time of the network NW per document at each compression rate. Since the compression rate of the image file refers to the ratio of the data amount of the image file, the transfer time of the network NW per document is reduced in proportion to a ratio at which the compression rate of the image file is reduced. Then, the subroutine of the transfer rate diagnosis process is ended.

In Step S406, the controller 50 designates dummy data to be transferred. When the controller 50 receives the input indicating that the image file of the actual document is not transferred in Step S301, the controller 50 displays the list of dummy data on the display section 70 in advance. Regarding each piece of dummy data displayed on the display section 70, the explanation of each piece of dummy data and the transfer size may be displayed as annotations. The explanation of the dummy data is an explanation that serves as a guide for the user to select the dummy data. For example, "communication document (single-sided document, 2 sheets)", "communication document (double-sided document, 4 sheets)", "product leaflet (double-sided document, one sheet)", and "newspapers, magazines (double-sided document, 10 sheets)" are provided. For the same reason as that when the transfer size is set to the largest compression rate in Step S402, the transfer size displayed on the display section 70 is the transfer size when the largest compression rate is set for an image file having a type described in the explanation of the dummy data. The user selects the dummy data close to the target from the dummy data displayed on the display section 70. Then, the process proceeds from Step S406 to Step S407.

In Step S407, the controller 50 transfers the dummy data designated by the user to the output destination, and the process proceeds from Step S407 to Step S408.

When the transfer completion response of the image file is received from the external terminal 80 in Step S408, Step S408 becomes YES, and the process proceeds from Step S408 to Step S409.

In Step S409, the controller 50 converts the transfer time of the network NW of the dummy data into the transfer time of the network NW per document. Then, the controller compares the reading time of one document with the transfer time of the network NW per document.

In Step S410, the controller 50 changes the data transfer amount in several steps in the direction of decreasing the compression rate of the image file. That is, the controller 50 illustrated in FIG. 2 calculates the transfer time of the network NW of each piece of dummy data when the transfer amount of the dummy data is changed in several steps. At this time, the transfer time of the network NW per document is reduced in proportion to the ratio at which the compression rate of the image file is reduced. Then, the subroutine of the transfer rate diagnosis process is ended.

Flow of Compression Rate Determination Process

Next, the subroutine of the compression rate determination process in the first embodiment will be described with reference to the flowchart illustrated in FIG. 5. In this routine, the controller 50 illustrated in FIG. 2 determines the compression rate of the image file to be used in the actual transfer of the image file, from the result of the transfer rate diagnosis process. That is, in this routine, the controller 50 illustrated in FIG. 2 executes the compression rate determination process of determining the compression rate of an image file generated by the image generation process (described later), based on the transfer rate of the network NW to the external terminal 80 illustrated in FIG. 2 in the transfer rate diagnosis process and the reading rate of the reading section 40 illustrated in FIG. 2.

The "reading rate" here does not refer to the rate of a document P when the document P passes through the reading section 40 illustrated in FIG. 2. The reading rate refers to the data amount when image data of the document P is compressed, and the image reading apparatus 11 processes the compressed image data per hour.

In the first embodiment, in a case where, when the document P has image data on both sides, the document P passes through the reading section 40 illustrated in FIG. 2 once, the reading section 40 illustrated in FIG. 2 in the image reading apparatus 11 reads the image data on both sides of the document P. At this time, "the data amount of an image file obtained by compressing the image data on the front surface of the document P" and "the data amount of an image file obtained by compressing the image data on the back surface of the document P" are added. The value when the value obtained by the addition is divided by "the time taken for the image reading apparatus 11 to process one document P" is the "reading rate". When the controller 50 illustrated in FIG. 2 in the image reading apparatus 11 has a processing capability to execute a compression process while the document P is transported at regular intervals, the time interval at which the document P passes through the reading section 40 is "the time taken for the image reading apparatus 11 to process one document P".

Since the data amount of the image file obtained by compressing the image data on the front or back surface of the document P differs depending on the image, the reading rate differs for each document P. The capability of the controller 50 illustrated in FIG. 2 may be low, and the controller 50 illustrated in FIG. 2 may not have the processing capability to compress the image file during the time when the document P passes through the reading section 40. At this time, the time interval at which the document P passes through the reading section 40 changes depending on the processing time for the controller 50 illustrated in FIG. 2 to compress the image file. As described above, even when the time interval at which the document P passes through the reading section 40 is not constant, the "reading rate" is calculated by dividing "the data amount of the image file obtained by compressing the image data of the document P" by "the time taken for the controller 50 illustrated in FIG. 2 to process the one document P". The "reading rate" is also referred to as a "reading rate of an image file" because the reading rate means the processing rate of the data amount of an image file obtained by compressing image data. The average processing rate of the data amount of a plurality of image files is also referred to as an "average reading rate of image files".

In Step S501, before determining the compression rate, the controller 50 illustrated in FIG. 2 determines whether the user selects the compression rate or the controller 50 automatically selects the compression rate, from the result of the transfer rate diagnosis process. In Step S501, the user or the administrator may set the compression rate as an initial setting in advance when the image reading apparatus 11 is installed. The user may input and determine the compression rate with the input section 24 illustrated in FIG. 1 in Step S501. When the user selects the compression rate, Step S501 becomes YES, and the process proceeds to Step S502. When the controller 50 illustrated in FIG. 2 automatically selects the compression rate, Step S501 becomes NO, and the process proceeds to Step S504.

In Step S502, the controller 50 causes the display section 70 illustrated in FIG. 1 to display the transfer time of the image file with the plurality of compression rates and a single document reading processing time side by side. In addition, the controller causes the display section to mark and display the recommended compression rate among the plurality of displayed compression rates. That is, the display section 70 illustrated in FIG. 1 displays the result of the transfer rate diagnosis process when the transfer rate diagnosis process is ended. The compression rate recommended by the display section is the compression rate having the largest data amount of the image file that can be transferred without reducing the throughput of the transfer process of the network NW. The image file compressed at the recommended compression rate is an image file having the highest image quality among the image files that can be transferred without reducing the throughput of the transfer process of the network NW.

That is, the image reading apparatus 11 has a configuration of enabling selection of the compression rate having the largest image file that can be transferred without reducing the throughput of the transfer process of the network NW, based on the transfer rate of the network NW when transferring the image file to the external terminal 80 illustrated in FIG. 2 and the reading rate of the reading section 40 illustrated in FIG. 2. Then, in Step S502, the process proceeds to Step S503.

In Step S503, the controller 50 receives an input indicating that the compression rate marked and displayed on the display section 70 is selected, from the input section 24 operated by the user. When there is a reason, for example, that the remaining capacity for storing files on the output destination disk is small, the user may select a different compression rate. When the controller 50 receives the compression rate selected by the user operating the input section 24, the controller ends the subroutine of the compression rate determination process.

In Step S504, the controller 50 selects the compression rate having the largest data amount of the image file that can be transferred without reducing the throughput of the transfer process of the network NW. Then, the controller 50 illustrated in FIG. 2 ends the subroutine of the compression rate determination process.

The compression rate determined in the compression rate determination process will be used in the next image generation process. That is, assuming that an image file used in the transfer rate diagnosis process is a first image file, an image file generated in the next image generation process with the compression rate determined in the compression rate determination process in order to be transferred in the next transfer process is a second image file.

Flow of Document Reading Process

Next, the subroutine of the document reading process in the first embodiment will be described with reference to the flowchart illustrated in FIG. 6. In this routine, the reading section 40 illustrated in FIG. 2 reads the actual document P, and the controller 50 illustrated in FIG. 2 uses the determined compression rate to generate an image file, and then transfers the generated image file to the output destination.

The user sets the document P to be transferred to the output destination, as an image file, in the feeding tray 13 illustrated in FIG. 1. Then, the user presses the start switch 22 illustrated in FIG. 1.

In Step S601, the controller 50 receives a reading start instruction by pressing the start switch 22. In Step S602, the controller 50 determines whether or not there is a document in the feeding tray. While the document P is in the feeding tray 13, the determination result in Step S602 becomes YES, and the process proceeds to Step S603.

In Step S603, the controller 50 illustrated in FIG. 2 transports one document P from the feeding tray illustrated in FIG. 1 and starts reading of an image of the document P. In the first embodiment, when the document P passes through a transport path (not illustrated) once, the reading section 40 illustrated in FIG. 2 reads images on both sides of the document P.

In Step S604, the controller 50 executes the image generation process of generating a single image file from image data of the document read by the reading section 40 illustrated in FIG. 2. The image generation process is executed at the compression rate of preset data selected in Step S302 illustrated in FIG. 3 or the compression rate selected in the compression rate determination process illustrated in FIG. 5, which is executed in Step S500.

As the file type of image file, formats such as jpeg, pdf, and tiff, that enables data compression, are provided. The same file format of the generated image file is referred to as being single. In the first embodiment, since the images on both sides of the document P are read by causing the document P to pass once through the transport path (not illustrated), two image files being a front image of the document P and a back image of the document P are generated. The two image files are single image files.

In Step S605, the controller 50 causes the transmitter 60 illustrated in FIG. 2 to transfer the image file generated by the image generation process in Step S604 to the external terminal 80 connected via the network NW. Then, in Step S605, the process proceeds to Step S602 again.

In Step S602, while the document P is in the feeding tray 13, the determination result in Step S602 becomes YES, and the loop is repeated. During the loop in the document reading process illustrated in FIG. 6, the reading section 40 illustrated in FIG. 2 reads the document P in order. The controller 50 illustrated in FIG. 2 executes the image generation process in Step S604. When there is no document P in the feeding tray 13, the determination result in Step S602 becomes NO, and the controller 50 illustrated in FIG. 2 ends the subroutine of the document reading process.

This embodiment is not only the embodiment of the image reading apparatus 11 but also the embodiment of the image reading system 100.

The image reading system 100 illustrated in FIG. 2 in the first embodiment executes the compression rate determination process of determining the compression rate of the image file of the document P based on the transfer rate of the image file to the external terminal 80 illustrated in FIG. 2 and the reading rate of the image reading apparatus 11.

The image reading system 100 illustrated in FIG. 2 in the first embodiment executes the transfer rate diagnosis process of designating the image quality setting and the output destination and calculating the transfer rate of the network NW to the external terminal 80 based on the transfer time when the image reading apparatus 11 transfers the image file to the external terminal 80 including the output destination.

The image reading system 100 illustrated in FIG. 2 in the first embodiment includes the input section 24 capable of designating the image quality setting and the output destination and the display section 70 capable of displaying the result of the transfer rate diagnosis process, in the transfer rate diagnosis process.

This embodiment is not only the embodiment of the image reading apparatus 11 but also the embodiment of an image reading method.

Figure 3:
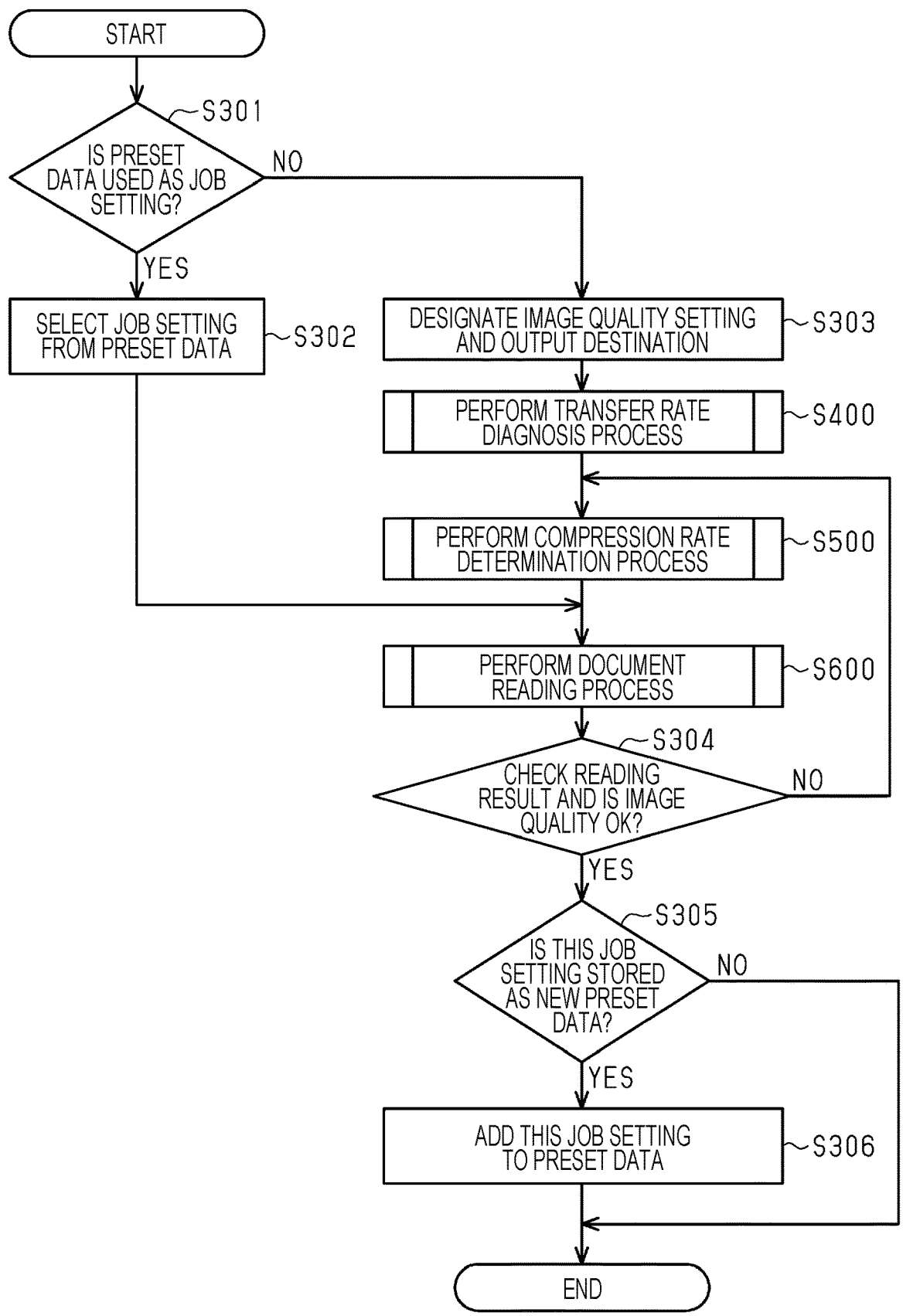
FIG. 3 is a flowchart illustrating an image transfer process in the first embodiment.

The image reading method illustrated in FIG. 3 in the first embodiment includes an image generation process step of generating a single first image file from image data obtained by the reading section 40 reading the document P and a transfer step of transferring the first image file to the external terminal 80 connected via the network NW by the transmitter.

The image reading method illustrated in FIG. 3 in the first embodiment further includes a compression rate determination process step of determining a compression rate of a second image file in the next image generation process step based on the transfer rate of the network NW when the first image file is transferred to the external terminal 80, and the reading rate of the reading section 40.

The operation in the first embodiment will be described.

As illustrated in FIG. 1, when the user presses the power switch 21 illustrated in FIG. 1, the power of the image reading apparatus 11 is turned on, and the routine of the image transfer process illustrated in FIG. 3 is started.

When the image reading apparatus 11 firstly transfers image data, the image reading apparatus 11 does not have preset data as a job setting. Thus, the user designates an image quality setting of the document P set in the feeding tray 13, an output destination, and the number of sheets per job, with the input section 24 illustrated in FIG. 2. Depending on the user, the image quality setting is set to double sides/color/jpeg, and the output destination is set to a folder B of a server A. Since the processing to be performed by the image reading apparatus 11 from now on is for the purpose of diagnosing the transfer rate of the network NW, even when the number of documents P to be intended to be transferred by the user is as many as 50, it is not necessary to set all the documents P in the feeding tray 13. The user selects, for example, five representative documents P from the fifty documents P. When the five documents are set in the feeding tray 13, the number of sheets per job is set to five.

A case where an initial setting as follows is set in advance by the user when the image reading apparatus 11 is installed will be described. The initial setting is set so that, when the controller 50 illustrated in FIG. 2 executes the transfer rate diagnosis process illustrated in FIG. 4, the reading section 40 illustrated in FIG. 2 actually reads the document P, and the transmitter 60 illustrated in FIG. 2 transfers an image file to an output destination. The compression rate when the image file is transferred is set to the compression rate having the largest transfer size in the designated image quality setting. For example, in the image reading apparatus 11 in the first embodiment, assuming that the maximum compression rate of the transfer size of a jpeg file is 80%, the compression rate is set to 80%.

The document reading process illustrated in FIG. 6 is started. The user sets five documents P in the feeding tray 13. When the start switch 22 is pressed by the user, the documents P are fed one by one from the feeding tray 13, and reading of images of the documents P is started in the double-sided mode and the color mode. Jpeg image files compressed at the set compression rate are sequentially generated page by page, and are sequentially transferred to the folder B of the server A which is the set output destination.

The controller 50 illustrated in FIG. 2 measures the transfer time until each image file reaches the transfer destination. When there are five double-sided documents P and there is no blank sheet, the number of pages is ten, and the ten image files are generated. Thus, the controller measures the transfer time until the image files reach the transfer destinations. When generating a jpeg image file, the controller 50 illustrated in FIG. 2 recognizes the size of the generated image file. Thus, the controller calculates the transfer rate of the network NW illustrated in FIG. 2 from the size of the generated image file and the transfer time until the image file reaches the transfer destination. Then, the controller 50 illustrated in FIG. 2 calculates the average value of the transfer times of the ten image files and the average value of the transfer rates of the ten image files.

Regarding the compression rate when the controller 50 illustrated in FIG. 2 in the first embodiment compresses the image file into a jpeg file, when the controller 50 illustrated in FIG. 2 has three types of compression rates, for example, 80%, 70%, and 60%, the controller calculates the transfer time at each compression rate. Since both sides of the document P are read, the transfer time of the image file per read document P is obtained by adding the transfer time of the image file of the front surface and the transfer time of the image file of the back surface.

Assuming that the average value of the transfer time when a jpeg file having a compression rate of 80% is transferred is V80, the file size of the jpeg file having a compression rate of 70% is 70/80. Therefore, assuming that the average value of the transfer time when a jpeg file having a compression rate of 70% is transferred is V70, V70=V80×70/80. Similarly, assuming that the average value of the transfer time when a jpeg file having a compression rate of 60% is transferred is V60, V60=V80×60/80. That is, the transfer time is proportional to the compression rate of the file.

A case where the initial setting when the image reading apparatus 11 is installed is set in advance by the user so that the user selects the compression rate when the controller 50 illustrated in FIG. 2 executes the compression rate determination process illustrated in FIG. 5 will be described.

The controller 50 illustrated in FIG. 2 arranges the average value of the transfer time of the image file in accordance with the compression rate and the single document reading processing time, on the display section 70. That is, the average value of the transfer time of the image file when the compression rate is 80%, and the average value of the transfer time of the image file when the compression rate is 70%, and the average value of the transfer time of the image file when the compression rate is 60% are arranged. Then, as a reference, the average value of the image file size at each compression rate is also displayed at each compression rate. Therefore, the user can execute the next compression rate determination process to be executed the next time, after confirming the result of the transfer rate diagnosis process. The user can determine whether the user determines the compression rate, or determine whether a job needs to be performed again, in accordance with the result of the transfer rate diagnosis process.

The single document reading processing time refers to the time taken for the image reading apparatus 11 to read one document P. When the transfer rate of the network NW is sufficiently faster than the rate at which the image reading apparatus 11 reads the image of one document P, there is no waiting time on the image reading apparatus 11 side. Thus, the single document reading processing time is equal to the time interval at which the document P passes through the reading section 40 illustrated in FIG. 2. However, in the transfer rate diagnosis process illustrated in FIG. 4, since a load is applied to the transfer by increasing the transfer size, the time interval at which the document P passes through the reading section 40 illustrated in FIG. 2 may be longer than the single document reading processing time.

The controller 50 illustrated in FIG. 2 compares the average transfer time of the image file at each compression rate with the single document reading processing time, and marks and displays the recommended compression rate on the display section 70 illustrated in FIG. 2. The recommended compression rate refers to the maximum compression rate at which the average transfer time of the image file does not exceed the document reading processing time.

For example, when (the average transfer time of an image file when the compression rate of 80%)>(the single document reading processing time)>(the average transfer time of an image file when the compression rate of 70%)>(the average transfer time of an image file when the compression rate of 60%), (the average transfer time of an image file when the compression rate of 70%) is marked.

The user selects the compression rate marked on the display section 70 illustrated in FIG. 2 with the input section 24 illustrated in FIG. 2. Therefore, the controller 50 is less likely to make the reading rate of the reading section 40 in the image reading apparatus 11 slower than the transfer rate to the external terminal 80. Since the controller 50 illustrated in FIG. 2 executes the compression rate determination process based on the result obtained by executing the transfer rate diagnosis process of calculating the transfer rate of the network NW to the external terminal 80, it is possible to appropriately suppress deterioration of image quality of the transferred image file. Since the image quality setting and the output destination are designated with the input section 24, it is possible to determine the compression rate in accordance with setting of a job actually performed when the controller 50 executes the compression rate determination process.

However, when the recommended compression rate is lower than the compression rate expected by the user, the user may select another compression rate. That is, the user can check whether the displayed compression rate has the desired value. When the displayed compression rate does not have the desired value, the user can change the designation of the image quality setting or the output destination.

When the compression rate is selected, the controller 50 illustrated in FIG. 2 executes the document reading process of all documents P intended to be actually transferred by the user. The user sets 50 documents P in the feeding tray 13. When the start switch 22 is pressed by the user, the documents P are fed one by one from the feeding tray 13, and reading of images of the documents P is started in the double-sided mode and the color mode. Jpeg image files compressed at the compression rate selected earlier by the user are sequentially generated page by page, and are sequentially transferred to the folder B of the server A which is the set output destination.

When the transfer is ended, the controller 50 illustrated in FIG. 2 displays a confirmation image of the reading result on the display section 70 illustrated in FIG. 2. The user can check whether the image quality of the transferred image file is the desired image quality. Then, when the image quality of the displayed image file is not the desired image quality, the user can change the job setting to perform the job again.

The user may register the job setting of the previously-executed job, in the image reading apparatus 11 as preset data. When the user performs the next job by registering the job setting as the preset data, it is possible to use the job setting to execute the document reading process and transfer image data, even though the controller 50 illustrated in FIG. 2 does not execute the transfer rate diagnosis process illustrated in FIG. 4 and the compression rate determination process illustrated in FIG. 5. That is, when the controller 50 already has information on the appropriate compression rate, it is possible to execute the image reading process in a short time by selecting the compression rate and executing the image generation process. Further, it is possible to reduce the possibility that the reading rate of the reading section 40 in the image reading apparatus 11 is slower than the transfer rate to the external terminal 80.

When the transfer rate diagnosis process illustrated in FIG. 4 and the compression rate determination process illustrated in FIG. 5 are executed when the user performs the next job, it is possible to select the more appropriate compression rate in accordance with the situation at this time.

The effects in the first embodiment will be described.

(1) The controller 50 executes the compression rate determination process of determining the compression rate of the second image file in the image generation process based on the transfer rate of the network NW when the first image file is transferred to the external terminal and the reading rate of the reading section 40. Therefore, the controller 50 reduces the possibility that the reading rate of the reading section 40 in the image reading apparatus 11 is slower than the transfer rate to the external terminal 80, and thus it is possible to provide a comfortable processing rate and to suppress deterioration of image quality of the transferred image file.

(2) The controller 50 executes the compression rate determination process based on the result obtained by executing the transfer rate diagnosis process of designating the image quality setting and the output destination, and calculating the transfer rate of the network NW based on the transfer time when the transmitter 60 transfers the first image file to the external terminal including the output destination. Therefore, the controller 50 obtains an appropriate compression rate based on the execution result of the transfer rate diagnosis process, and thus reduces the possibility that the reading rate of the reading section 40 in the image reading apparatus 11 is slower than the transfer rate to the external terminal 80. Accordingly, it is possible to provide a comfortable processing rate and to appropriately suppress deterioration of image quality of the transferred image file.

(3) Since the image quality setting and the output destination are designated with the input section 24, it is possible to determine the compression rate in accordance with setting of a job actually performed when the controller 50 executes the compression rate determination process.

(4) When the controller 50 already has information on the appropriate compression rate, it is possible to execute the image reading process in a short time by selecting the compression rate and executing the image generation process. Further, it is possible to reduce the possibility that the reading rate of the reading section 40 in the image reading apparatus 11 is slower than the transfer rate to the external terminal 80, and thus it is possible to provide a comfortable processing rate and to appropriately suppress deterioration of image quality of the transferred image file. It is possible to select the more appropriate compression rate in accordance with the situation at this time by executing the transfer rate diagnosis process and the compression rate determination process and then executing the image generation process. Thus, it is possible to reduce the possibility that the reading rate of the reading section 40 in the image reading apparatus 11 is slower than the transfer rate to the external terminal 80, and thus it is possible to provide a comfortable processing rate and to appropriately suppress deterioration of image quality of the transferred image file.

(5) The user can execute the next compression rate determination process to be executed the next time, after confirming the result of the transfer rate diagnosis process. The user can determine whether the user determines the compression rate, or determine whether a job needs to be performed again, in accordance with the result of the transfer rate diagnosis process. Therefore, it is possible to reduce the possibility that the reading rate of the reading section 40 in the image reading apparatus 11 is slower than the transfer rate to the external terminal 80, and thus it is possible to provide a comfortable processing rate and to suppress deterioration of image quality of the transferred image file.

(6) The user can check whether the displayed compression rate has a desired value. When the displayed compression rate does not have a desired value, the user can change the designation of the image quality setting or the output destination. Therefore, it is possible to reduce the possibility that the reading rate of the reading section 40 in the image reading apparatus 11 is slower than the transfer rate to the external terminal 80, and thus it is possible to provide a comfortable processing rate and to suppress deterioration of image quality of the transferred image file.

(7) The user can check whether the image quality of the transferred image file is the desired image quality. Then, when the image quality of the displayed image file is not the desired image quality, the user can change the job setting to perform the job again. Therefore, it is possible to reduce the possibility that the reading rate of the reading section 40 in the image reading apparatus 11 is slower than the transfer rate to the external terminal 80, and thus it is possible to provide a comfortable processing rate and to suppress deterioration of image quality of the transferred image file.

(8) In the image reading system 100, it is possible to obtain the same effects as those of the image reading apparatus 11 described in (1) to (7) above.

(9) In the image reading method of the image reading apparatus 11, it is possible to obtain the same effects as those of the image reading apparatus 11 described in (1) to (7) above.

Second Embodiment

An image reading apparatus 11 according to a second embodiment will be described below with reference to the drawings. The configurations of the image reading apparatus 11 and an image reading system 100 in the second embodiment are substantially the same as those in the first embodiment. Thus, the same components are denoted by the same reference signs, and repetitive description will be omitted.

Overall Flow of Image Transfer Process

The image transfer process executed by the controller 50 will be described with reference to the flowcharts illustrated in FIGS. 7 to 10.

Firstly, the entire routine of the image transfer process in the second embodiment will be described with reference to the flowchart illustrated in FIG. 7.

In Step S701, the controller 50 determines whether or not to use the preset data as a preprocessing setting. The user selects whether or not to use the preset data as the preprocessing setting for a job to be performed from now on. The preset data is configured by a job setting in which the image quality setting and the output destination are designated, and the compression rate of an image file. In the second embodiment, the compression rate of image data changes depending on the situation while image data of a plurality of documents is transferred. Thus, in order to distinguish the job setting from the job setting in the first embodiment, the preset data in the second embodiment is referred to as the preprocessing setting.

The input section 24 has a configuration of allowing the user to select whether an image is transferred by using a record of the previous transfer rate to omit the measurement of the transfer rate, which is a pre-process of the transfer, or the image is transferred after the current transfer rate is measured. In Step S701, when the preprocessing setting is provided in the list of the preset data displayed on the display section 70 illustrated in FIG. 1, the controller 50 causes the process to proceed to Step S702.

The user selects a job setting from the list of preset data. Then, In Step S701, when receiving, from the input section 24, an input indicating that the job setting is selected from the list of the preset data, the controller 50 causes the process to Step S702.

Figure 8:
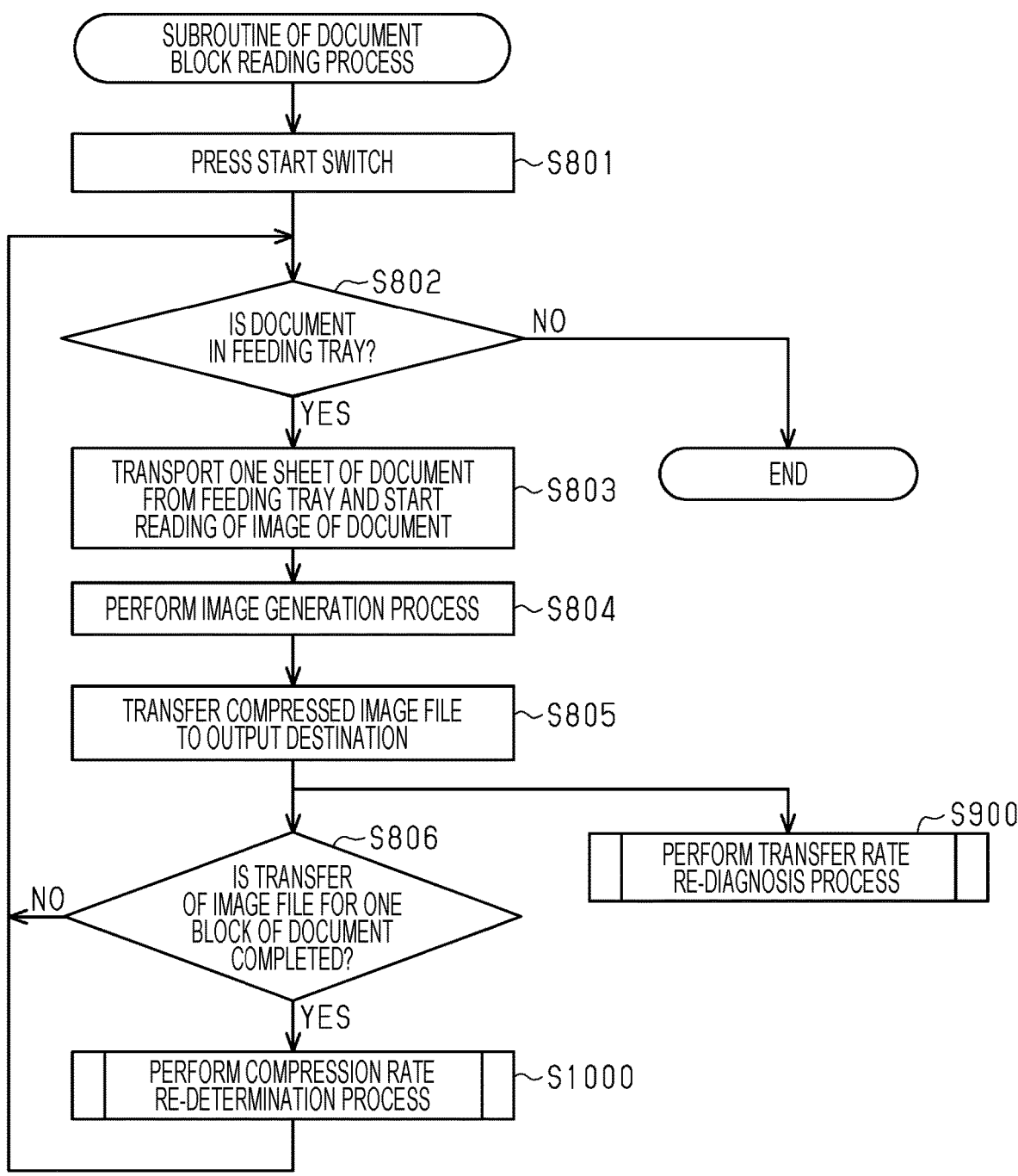
FIG. 8 is a flowchart illustrating a document block reading process in the second embodiment.

In Step S702, when the preprocessing setting is selected, the process proceeds to a document block reading process in Step S800, which is illustrated in FIG. 8. The preset data has a configuration with the compression rate. Thus, the compression rate is also designated when the user selects the job setting from the list of the preset data.

In Step S701, when there is no job setting suitable for the purpose in the list of preset data, or when any job setting is not registered, Step S701 becomes NO, and the process proceeds to Step S703. Since the job setting is not registered even when the user performs the operation for the first time, the process proceeds from Step S701 to Step S703.

In Step S703, when the controller 50 receives the image quality setting and the output destination from the input section 24 operated by the user, the controller designates the image quality setting and the output destination. The display section 70 illustrated in FIG. 1 displays a compression rate used for the image generation process described later. That is, the display section 70 illustrated in FIG. 1 displays the compression rate to be used for the image generation process when the image quality setting and the output destination are designated. Then, the process proceeds from Step S703 to Step S400.

In Step S400, the controller 50 executes the subroutine of the transfer rate diagnosis process illustrated in FIG. 4. When the diagnosis of the transfer rate is completed, the process proceeds from Step S400 to Step S500.

In Step S500, the controller 50 executes the subroutine of the compression rate determination process illustrated in FIG. 5. When the compression rate is determined, the process proceeds from Step S500 to Step S800.

In Step S800, the controller 50 executes the subroutine of the document block reading process illustrated in FIG. 8.

The subroutine of the document block reading process will be described later. When the document block reading process is ended, the controller 50 ends the image transfer process.

The flow of the transfer rate diagnosis process in Step S400 and the flow of the compression rate determination process in Step S500 in the second embodiment are the same as those in the first embodiment. Thus, description will not be repeated.

Also in the second embodiment, the image reading system 100 may include a PC (not illustrated), and the PC may be connected to the image reading apparatus 11 and include a display section and an input section.

Flow of Document Block Reading Process

Next, the subroutine of the document block reading process in the second embodiment will be described with reference to the flowchart illustrated in FIG. 8. In this routine, when the reading section 40 illustrated in FIG. 2 reads an actual document, the controller 50 illustrated in FIG. 2 divides the document into a plurality of document groups. Then, the controller uses the determined compression rate to generate the first image file group and transfers the generated image file group to the output destination. The controller 50 illustrated in FIG. 2 measures the transfer time of the image file group, and determines the compression rate of the image file group to be transferred next, from the result of the measurement. The controller 50 illustrated in FIG. 2 continues this routine until the document P does not remain. One document group obtained by division into a plurality of document groups is referred to as a document block. In order to distinguish the document reading process from the document reading process in the first embodiment, the process illustrated in FIG. 8 in the second embodiment is referred to as the document block reading process.

The user sets the document P to be transferred to the output destination, as an image file, in the feeding tray 13 illustrated in FIG. 1.

In Step S801, the controller 50 receives an input indicating that the user presses the start switch 22 illustrated in FIG. 1. In the next Step S802, the controller 50 determines whether or not there is a document in the feeding tray. While the document P is in the feeding tray 13, the determination result in Step S802 becomes YES, and the process proceeds to Step S803.

In Step S803, the controller 50 transports one document P from the feeding tray illustrated in FIG. 1 and starts reading of an image of the document P. In the second embodiment, when the document P passes through a transport path (not illustrated) once, the reading section 40 illustrated in FIG. 2 reads images on both sides of the document P.

In Step S804, the controller 50 executes an image generation process of generating a single image file from a document read by the reading section 40 at the compression rate selected immediately before. The compression rate selected immediately before is any of the compression rate of the preset data selected in Step S702 illustrated in FIG. 7, the compression rate selected in the compression rate determination process of Step S500 illustrated in FIG. 7, which is executed immediately before, and the compression rate selected in a compression rate re-determination process in Step S1000 (described later) illustrated in FIG. 8, which is executed immediately before.

In Step S805, the controller 50 illustrated in FIG. 2 causes the transmitter 60 illustrated in FIG. 2 to transfer the image file generated by the image generation process in Step S804 to the external terminal 80 connected via the network NW. Then, the process proceeds from Step S805 to Step S900 and Step S806.

Figure 9:
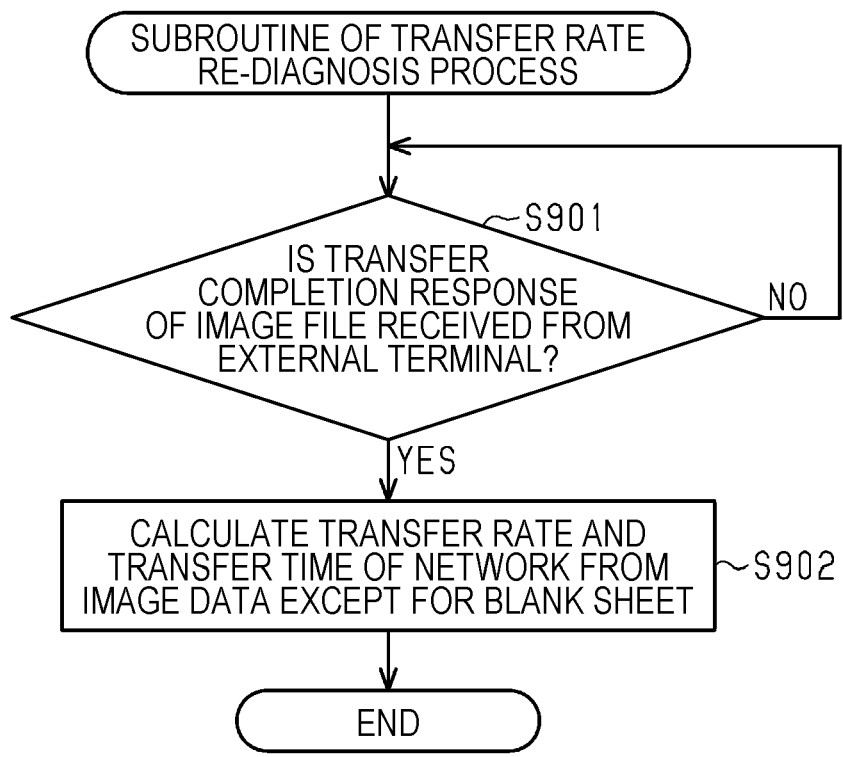
FIG. 9 is a flowchart illustrating a transfer rate re-diagnosis process in the second embodiment.

In Step S900, the controller 50 illustrated in FIG. 2 executes the subroutine of a transfer rate re-diagnosis process illustrated in FIG. 9. The subroutine of transfer rate re-diagnosis process will be described later.

In Step S806, the controller 50 illustrated in FIG. 2 checks whether or not the transfer of the image file of the document P for one block is completed. For example, when one block is configured by four images, the controller 50 illustrated in FIG. 2 checks whether or not the transfer of the four image files is completed. In the second embodiment, since the reading section 40 illustrated in FIG. 2 reads the images on both sides of the document P by causing the document P to pass once through a transport path (not illustrated), one block is configured by two image files of the document P.

One block may not be configured by four images. One block may be configured by one image, or may be configured by more images. The one block may be configured by an even number of images or an odd number of images.

When one side of the document P is blank, the image reading apparatus 11 may have a function of recognizing that the one side of the document P is blank and not executing the transfer process. In this case, the data is not transferred, but since the same time is taken to perform reading, one block is formed by also counting the blank sheet as an image file.

In Step S806, when the transfer of the image file of the document P for one block is completed, Step S806 becomes YES, and the process proceeds to the compression rate re-determination process in Step S1000 described later.

In Step S806, when the transfer of the image file of the document P for one block is not completed, Step S806 becomes NO, and the process proceeds to Step S803.

In Step S802, while the document P is in the feeding tray 13, Step S802 becomes YES, and the loop is repeated. During the loop in the document reading process illustrated in FIG. 6, the reading section 40 illustrated in FIG. 2 reads the document P in order. The controller 50 illustrated in FIG. 2 executes the image generation process in Step S804. When there is no document P in the feeding tray 13, the determination result in Step S802 becomes NO, and the controller 50 illustrated in FIG. 2 ends the subroutine of the document reading process.

Flow of Transfer Rate Re-Diagnosis Process

Firstly, before describing the flow of the transfer rate re-diagnosis process, the reason that the controller 50 illustrated in FIG. 2 executes the transfer rate re-diagnosis process will be described.

In the second embodiment as well, similar to the first embodiment, the controller 50 illustrated in FIG. 2 executes the transfer rate diagnosis process illustrated in FIG. 4. In the transfer rate diagnosis process, the image quality setting and the output destination are designated, and the transfer rate of the network NW illustrated in FIG. 2 to the external terminal 80 is calculated based on the transfer time when the transmitter 60 illustrated in FIG. 2 transfers a first image file to the external terminal 80 including the output destination. Then, the controller 50 illustrated in FIG. 2 executes the compression rate determination process illustrated in FIG. 5, based on the transfer rate and the reading rate of the reading section 40 illustrated in FIG. 2.

The compression rate determined in the compression rate determination process will be used in the next image generation process. That is, assuming that an image file used in the transfer rate diagnosis process is the first image file, an image file generated in the next image generation process with the compression rate determined in the compression rate determination process in order to be transferred in the next transfer process is a second image file.

In the second embodiment, the controller 50 causes the transmitter 60 illustrated in FIG. 2 to transfer the second image file to the output destination. The second image file is compressed at the compression rate of the first image file, which is determined by the transfer rate diagnosis process illustrated in FIG. 4 and the compression rate determination process illustrated in FIG. 5. The controller 50 illustrated in FIG. 2 executes the transfer rate re-diagnosis process illustrated in FIG. 9. In the transfer rate re-diagnosis process, the transfer rate of the network NW illustrated in FIG. 2 to the external terminal 80 is calculated based on a transfer time when the transmitter 60 illustrated in FIG. 2 transfers the second image file to the external terminal 80 including the output destination.

Figure 10:
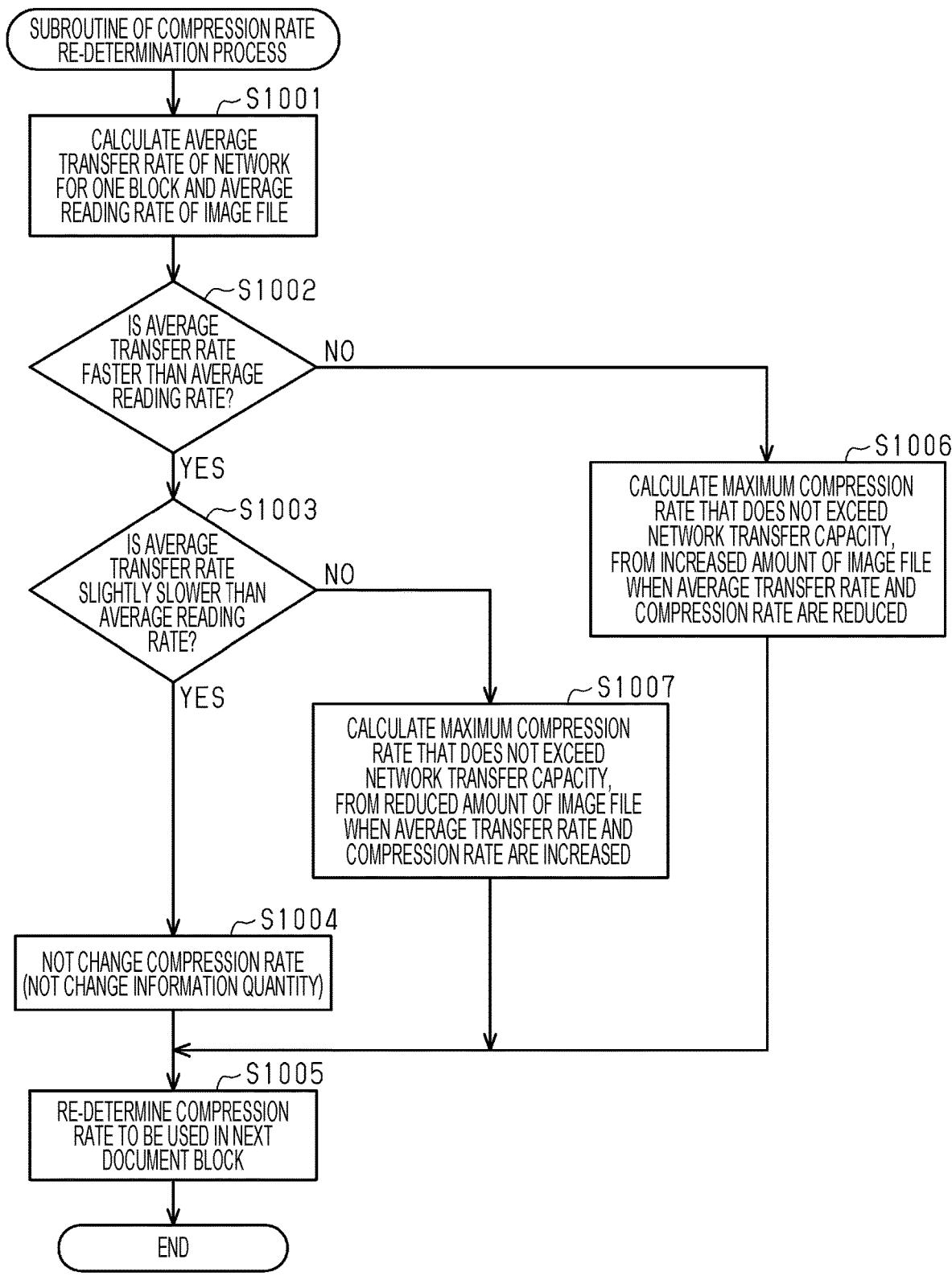
FIG. 10 is a flowchart illustrating a compression rate re-determination process in the second embodiment.

Since the transfer rate of the network NW normally changes, it is desirable to use the result of the transfer rate diagnosis process illustrated in FIG. 4, which was executed most recently. The first image file is an image file for which the compression rate determination process is executed immediately before the transmitter 60 transfers the second image file to the output destination. Therefore, in the second embodiment, the controller 50 executes the transfer rate re-diagnosis process illustrated in FIG. 9, and executes the compression rate re-determination process (described later) illustrated in FIG. 10 for the second image file in the image generation process, based on the previous transfer rate and the reading rate of the reading section 40. The second image file is an image file for which the compression rate re-determination process illustrated in FIG. 10 is executed immediately before the transmitter 60 transfers a third image file to the output destination. Therefore, in the second embodiment, the controller 50 executes the transfer rate re-diagnosis process illustrated in FIG. 9, and executes the compression rate re-determination process (described later) illustrated in FIG. 10 for the third image file in the image generation process, based on the previous transfer rate and the reading rate of the reading section 40.

As described above, in the document block reading process illustrated in FIG. 8, the controller 50 illustrated in FIG. 2 repeatedly executes the transfer rate re-diagnosis process illustrated in FIG. 9 and the compression rate re-determination process illustrated in FIG. 10. Thus, the controller 50 illustrated in FIG. 2 can determine the appropriate compression rate appropriate with respect to the transfer rate of the current network NW.

Next, the subroutine in which the controller 50 illustrated in FIG. 2 executes the transfer rate re-diagnosis process will be described with reference to the flowchart illustrated in FIG. 9.

When the transfer completion response of the image file is received from the external terminal 80 in Step S901, Step S901 becomes YES, and the process proceeds from Step S901 to Step S902.

In Step S902, when the controller 50 illustrated in FIG. 2 calculates the transfer rate of the network NW and the transfer time of the image file, the subroutine of the transfer rate re-diagnosis process is ended. For a blank sheet, the image file to be transferred is not generated. Thus, the transfer rate and the transfer time are not calculated.

Flow of Compression Rate Re-Determination Process

Next, the subroutine of the compression rate re-determination process in the second embodiment will be described with reference to the flowchart illustrated in FIG. 10.

In Step S1001, the controller 50 illustrated in FIG. 2 calculates the average transfer rate of the network NW in one block and the average reading rate of an image file from the transfer result of the image file for the one block. The average reading rate of an image file is calculated by dividing "the data amount of each piece of image data" by "the time taken for the image reading apparatus 11 to process each document" and averaging the values. Then, the process proceeds from Step S1001 to Step S1002.

In Step S1002, the controller 50 compares the average transfer rate with the average reading rate. When the average transfer rate is faster than the average reading rate, the amount of image data does not exceed the transfer capacity. Thus, the determination result in Step S1002 becomes YES, and the process proceeds to Step S1003.

In Step S1003, the controller 50 compares the average transfer rate with the average reading rate again. The average transfer rate is slightly smaller than the average reading rate. That is, when the transfer capacity has a slight margin with respect to the amount of image data, the determination result in Step S1003 becomes YES, and the process proceeds to Step S1004.

In Step S1004, the controller 50 determines that the compression rate is appropriate, and determines that the compression rate is not changed in the next block. Then, the process proceeds to Step S1005.

In Step S1002, the controller 50 compares the average transfer rate with the average reading rate. When the average transfer rate is not faster than the average reading rate, the amount of image data exceeds the transfer capacity or the transfer capacity has no margin. Thus, the determination result in Step S1002 becomes NO, and the process proceeds to Step S1006.

In Step S1006, the controller 50 calculates the maximum compression rate that does not exceed the transfer capacity of the network NW from the average transfer rate and the increased amount of the image file when the compression rate is reduced. However, the content of the image differs for each page, and, even though the compression rate is similarly 80%, the original image size differs. Thus, the image size after the compression also differs. That is, for any image, when the compression rate is set so as not to exceed the transfer capacity of the network NW, the compression rate becomes too small and the image quality is significantly deteriorated. Therefore, the margin for the compression rate may be set in accordance with the usage situation. Then, the process proceeds from Step S1006 to Step S1005.

In Step S1003, the controller 50 compares the average transfer rate with the average reading rate again. The average transfer rate is considerably smaller than the average reading rate. That is, when the transfer capacity has a large margin with respect to the amount of image data, the determination result in Step S1003 becomes NO, and the process proceeds to Step S1007.

In Step S1007, the controller 50 calculates the maximum compression rate that is unlikely to exceed the transfer capacity of the network NW, from the average transfer rate and the reduced amount of the image file when the compression rate is increased. However, the content of the image differs for each page, and, even though the compression rate is similarly 80%, the original image size differs. Thus, the image size after the compression also differs. That is, for any image, when the compression rate is set so as not to exceed the transfer capacity of the network NW, the compression rate becomes too small and the image quality is significantly deteriorated. Therefore, the margin for the compression rate may be set in accordance with the usage situation. Then, the process proceeds from Step S1007 to Step S1005.

In Step S1005, the controller 50 re-determines the compression rate to be used in the next document block. That is, the controller 50 illustrated in FIG. 2 selects the compression rate in which the image file that can be transferred without reducing the throughput of the transfer process of the network NW is the largest. Then, the controller 50 illustrated in FIG. 2 ends the subroutine of the compression rate determination process.

The transfer rate changes with time depending on the usage status of the network NW of another user. The reading rate also changes with time because the images are not generally the same as each other, some images have favorable compression efficiency, and some have poor compression efficiency. Therefore, even though the data size of the image file to be transferred is set to the maximum compression rate that does not exceed the transfer capacity of the network NW, the set data size may exceed the transfer capacity of the network NW. At this time, a waiting time is provided in the image reading apparatus 11. Since one block is configured by a plurality of images, the transfer rate and the reading rate are averaged, and the change of the compression rate slowly follows the transfer capacity of the network NW, which changes over time or the data size of the image file to be transferred.

This embodiment is not only the embodiment of the image reading apparatus 11 but also the embodiment of the image reading system 100.

The image reading system 100 illustrated in FIG. 2 in the second embodiment executes the compression rate determination process of determining the compression rate of the image file of the document P based on the transfer rate of the image file to the external terminal 80 illustrated in FIG. 2 and the reading rate of the image reading apparatus 11.

The image reading system 100 illustrated in FIG. 2 in the second embodiment executes the transfer rate diagnosis process of designating the image quality setting and the output destination and calculating the transfer rate of the network to the external terminal 80 based on the transfer time when the image reading apparatus 11 transfers the image file to the external terminal 80 including the output destination.

The image reading system 100 illustrated in FIG. 2 in the second embodiment includes the input section 24 capable of designating the image quality setting and the output destination and the display section 70 capable of displaying the result of the transfer rate diagnosis process, in the transfer rate diagnosis process.

This embodiment is not only the embodiment of the image reading apparatus 11 but also the embodiment of an image reading method.

Figure 7:
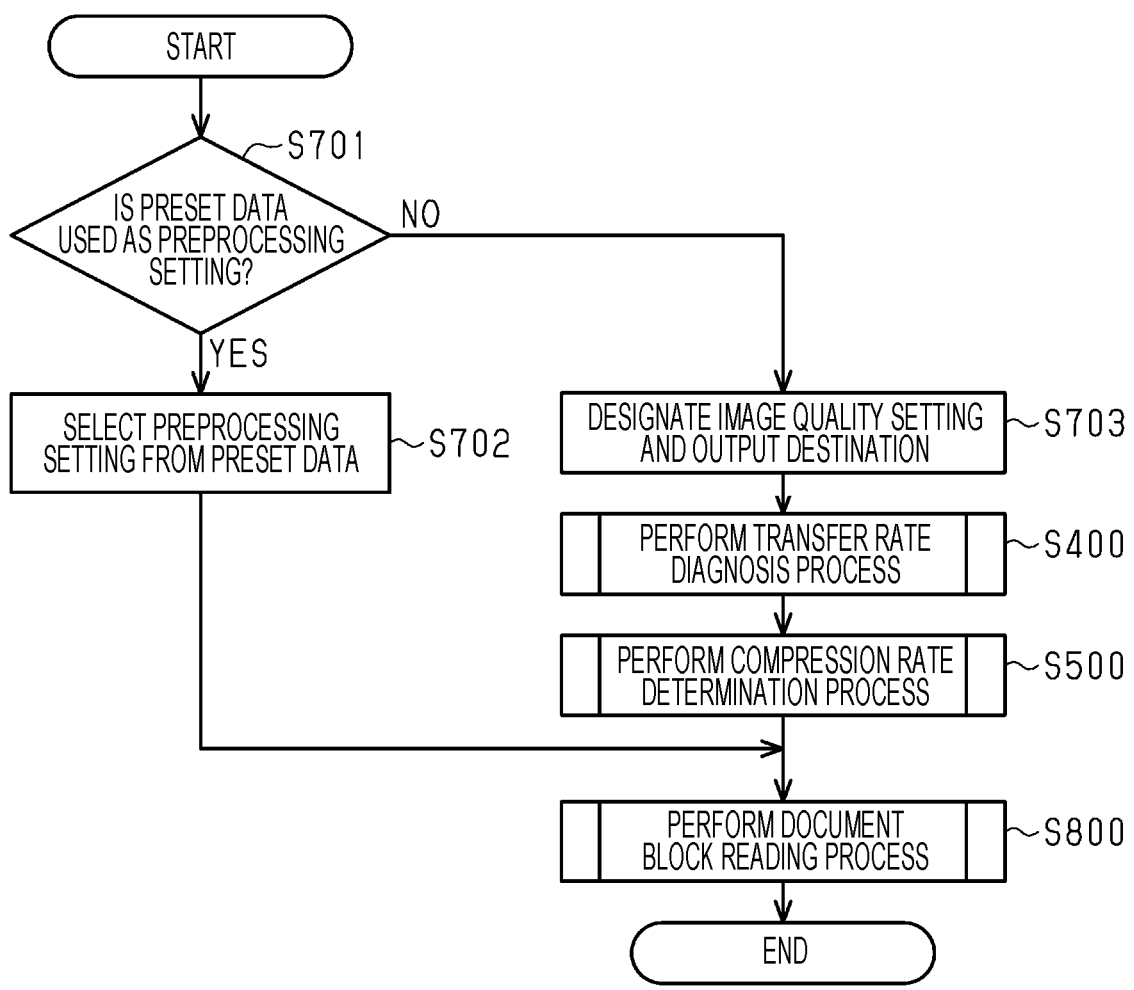
FIG. 7 is a flowchart illustrating an image transfer process according to the second embodiment.

The image reading method illustrated in FIG. 7 in the second embodiment includes an image generation process step of generating a single first image file from image data obtained by the reading section 40 reading the document P and a transfer step of transferring the first image file to the external terminal 80 connected via the network NW by the transmitter.

Further, the image reading method illustrated in FIG. 3 in the second embodiment further includes a compression rate determination process step of determining a compression rate of a second image file in the next image generation process step based on the transfer rate of the network NW when the first image file is transferred to the external terminal 80, and the reading rate of the reading section 40.

The operation in the second embodiment will be described.

As illustrated in FIG. 1, when the user presses the power switch 21 illustrated in FIG. 1, the power of the image reading apparatus 11 is turned on, and the routine of the image transfer process illustrated in FIG. 4 is started.

In the image reading apparatus 11, when image data is firstly transferred, the user designates the image quality setting and the output destination of a document P to be set in the feeding tray 13, with the input section 24 illustrated in FIG. 2. Depending on the user, the image quality setting is set to double sides/color/jpeg, and the output destination is set to a folder B of a server A.

A case where an initial setting as follows is set in advance by the user when the image reading apparatus 11 is installed will be described. The initial setting is set so that, when the controller 50 illustrated in FIG. 2 executes the transfer rate diagnosis process illustrated in FIG. 4, the reading section 40 illustrated in FIG. 2 transfers dummy data prepared in advance.

The user selects the dummy data close to the target from the dummy data displayed on the display section 70. For example, when "communication document (double-sided document, 4 sheets)" is selected, the size of the dummy data to be transferred is an average transfer size when the largest compression rate is set for an image file of the "communication document (double-sided document, 4 sheets)" in the jpeg file being the type of image file set in the image quality setting. The selected dummy data is transferred to the output destination by operating the input section 24.

The controller 50 illustrated in FIG. 2 measures the transfer time until the dummy data reaches the transfer destination. Since the controller 50 recognizes the size of the dummy data, the controller calculates the transfer rate of the network NW illustrated in FIG. 2 from the size of the dummy data and the transfer time until the dummy data reaches the transfer destination. The controller 50 starts the transfer before or during the start of reading of the document P having an image of an image file to be transferred. Then, the controller executes the transfer rate re-diagnosis process and the compression rate re-determination process for the image file. Thus, it is possible to reduce the processing time.

Regarding the compression rate when the controller 50 illustrated in FIG. 2 in the second embodiment compresses the image file into a jpeg file, when the controller 50 illustrated in FIG. 2 has three types of compression rates being 80%, 70%, and 60%, the controller calculates the transfer time at each compression rate. Since the dummy data has a data size on both sides, that is, on the premise that two pages of images are read, the transfer time per document P is the time obtained by dividing the total transfer time of the dummy data by four being the number of sheets. The transfer time per page is the time obtained by the total transfer time of the dummy data by eight being the number of pages.

Assuming that the average value of the transfer time when a jpeg file having a compression rate of 80% is transferred is V80, the file size of the jpeg file having a compression rate of 70% is 70/80. Therefore, assuming that the average value of the transfer time when a jpeg file having a compression rate of 70% is transferred is V70, V70=V80×70/80. Similarly, assuming that the average value of the transfer time when a jpeg file having a compression rate of 60% is transferred is V60, V60=V80×60/80. That is, the transfer time is proportional to the compression rate of the file.

A case where the initial setting when the image reading apparatus 11 is installed is set in advance by the user so that the controller 50 illustrated in FIG. 2 automatically selects the compression rate when the controller 50 illustrated in FIG. 2 executes the compression rate determination process illustrated in FIG. 5 will be described.

The controller 50 illustrated in FIG. 2 compares the average value of the transfer time of dummy data per document P with each compression rate and the single document reading processing time with each other. That is, the controller compares the average value of the dummy data transfer time when the compression rate is 80%, the average value of the transfer time of the dummy data when the compression rate is 70%, and the average value of the transfer time of the dummy data when the compression rate is 60%, with each other.

The controller 50 illustrated in FIG. 2 compares the transfer time of dummy data for one document P at each compression rate, with the single document reading processing time. The controller selects the maximum compression rate at which the transfer time of the dummy data for one document P does not exceed the document reading processing time. Therefore, the controller 50 is less likely to make the reading rate of the reading section 40 in the image reading apparatus 11 slower than the transfer rate to the external terminal 80. Since the controller 50 illustrated in FIG. 2 executes the compression rate determination process based on the result obtained by executing the transfer rate diagnosis process of calculating the transfer rate of the network NW to the external terminal 80, it is possible to appropriately suppress deterioration of image quality of the transferred image file. Since the image quality setting and the output destination are designated with the input section 24, it is possible to determine the compression rate in accordance with setting of a job actually performed when the controller 50 executes the compression rate determination process.

When the compression rate is selected, the controller 50 illustrated in FIG. 2 executes the reading process of all documents P intended to be actually transferred by the user. In the second embodiment, the document block reading process illustrated in FIG. 8, which executes the reading process for each document block, is executed.

The user sets 50 documents P in the feeding tray 13. When the start switch 22 is pressed by the user, the documents P are fed one by one from the feeding tray 13, and reading of images of the documents P is started in the double-sided mode and the color mode. Jpeg image files compressed at the compression rate selected earlier by the controller 50 illustrated in FIG. 2 are sequentially generated page by page, and are sequentially transferred to the folder B of the server A which is the set output destination.

Then, the controller 50 illustrated in FIG. 2 measures the transfer time until the image file reaches the transfer destination, for each image file in the transfer rate re-diagnosis process illustrated in FIG. 9. When generating a jpeg image file, the controller 50 illustrated in FIG. 2 recognizes the size of the generated image file. Thus, the controller also calculates the transfer rate of the network NW illustrated in FIG. 2 for each image file, from the size of the generated image file and the transfer time until the image file reaches the transfer destination.

In the second embodiment, since one block is configured by four images, the controller 50 illustrated in FIG. 2 checks whether or not the transfer of the four image files is completed. Further, in the second embodiment, when one side of the document P is blank, the blank page is also counted as an image file to form one block. That is, when two sheets of document P having four images are read, reading of one block is ended. Since the blank page is not transferred as an image file, the size of the image file is "zero" and the transfer rate of the network NW is not calculated.

Figure 11:
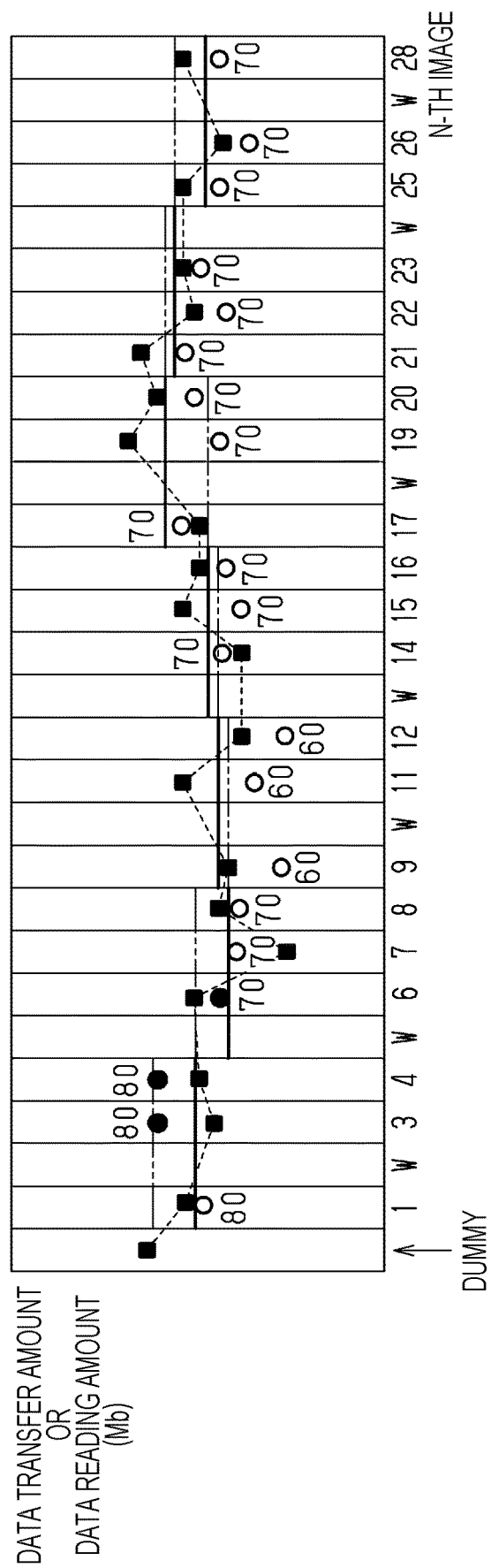
FIG. 11 is a graph showing changes in a transfer rate to an external terminal, a reading rate of a reading section, and a compression rate of an image file when the image transfer process is executed in the second embodiment.

FIG. 11 illustrates a graph of a change in the transfer status of image data in the second embodiment. A vertical axis indicates the data transfer amount of image data and the data read amount of the image data. A horizontal axis indicates the number of the image read by the reading section 40 illustrated in FIG. 2 in the image reading apparatus 11. "Dummy" described first from the left on the horizontal axis indicates that the data is dummy data. "1" described second from the left on the horizontal axis indicates that data is the first image data. "W" described third from the left on the horizontal axis indicates that the second image data is blank and is not transferred. That is, "W" indicates that the back surface of the first document P is blank. "3" described fourth from the left on the horizontal axis indicates that data is the third image data. "28" described first from the right on the horizontal axis indicates that data is the 28th image data, and indicates that there were 14 double-sided documents.

The "black square" plotted in the "dummy" column indicates a value obtained by converting the transfer rate of the network NW when the dummy data is transferred, into the amount of data per single document reading processing time. That is, the obtained value means an upper limit value of the transfer rate of the network NW when dummy data is transferred, and means an upper limit value of the amount of transferable data per single document reading processing time.

Since the value of the compression rate determined so that the amount of data to be transferred from now on is equal to or less than the upper limit value of the amount of transferable data is 80%, image data of the first block is transferred at the compression rate having a value of 80%.

When the transfer rate of the network NW does not change with time, the transfer rate of the network NW also has the same value as that when the dummy data is transferred, during the first one block. That is, the transfer rate of the network becomes a straight line parallel to the horizontal axis as indicated by a two-dot chain line. However, in practice, when the transfer rate of the network NW is measured for each piece of image data, the transfer rate of the network NW is indicated by the value plotted as the "black square" in each piece of image data. The value changes as indicated by a broken line. That is, the transfer rate of the network NW changes with time. Since the network NW is used by an unspecified number of people, the amount of data flowing on the network NW changes from time to time. Thus, the transfer rate of the network NW is not constant. Therefore, when the dummy data was transferred, the compression rate of 80% was optimal, but the compression rate of 80% is not normally optimal even during the first one block being the next time slot.

The content of the image differs for each page, and, even though the compression rate is similarly 80%, the original image size differs. Thus, the image size after the compression also differs. That is, even though pieces of the image data have the same compression rate of 80%, the image size after the compression may exceed the upper limit value of the amount of transferable data per single document reading processing time. In addition, the image size may not exceed the upper limit value of the amount of transferable data per single document reading processing time.

As illustrated in FIG. 11, the image data of the first one block includes three images of the first image, the third image, and the fourth image. All the three images are transferred at the compression rate having a value of 80%, based on the transfer result of the dummy data. The data transfer amount of an image file obtained by compressing image data of a document P per single document reading processing time, that is, the reading rate is indicated by the value at a place plotted as ○ or ●. 80 being the number attached to ○ or ● indicates that the image data was transferred at the compression rate of 80%.

In the second embodiment, one document is configured by two images of an image on the front surface and an image on the back surface. That is, the controller 50 illustrated in FIG. 2 transfers data of two image files per single document reading processing time. Therefore, the value when the data transfer amount of one image file is divided by the value being the half of the single document reading processing time is the reading rate of the one image file.

The reading rate of the first image is plotted as ○, and this indicates that the reading rate does not exceed the upper limit value of the amount of transferable data. The transfer rate of the network NW when the first image data was transferred was lower than the transfer rate of the network NW when the dummy data was transferred. However, since the first image data is smaller than the data transfer amount of the dummy data, it is estimated that the data size does not exceed the upper limit value of the amount of transferable data.

The reading rates of the third and fourth images are plotted as ●, and this indicates that the data size exceeds the upper limit value of the amount of transferable data. The transfer rate of the network NW when the first image data was transferred was lower than the transfer rate of the network NW when the dummy data was transferred. In addition, the third image data and the fourth image data are larger than the data transfer amount of the dummy data. Thus, it is estimated that the data size exceeds the upper limit value of the amount of transferable data.

The controller 50 illustrated in FIG. 2 averages the transfer rates of the network NW of the first one block except for the second image data which is blank. In FIG. 11, the average transfer rate of the network NW is indicated by a solid line. The value of the average reading rate indicated by the solid line is smaller than the data transfer amount indicated by the two-dot chain line. This indicates that the set compression rate is too large at the current transfer rate of the network NW. The controller 50 illustrated in FIG. 2 executes the compression rate re-determination process (illustrated in FIG. 10) of comparing the transfer time of image data for one document P when the compression rate is changed, with the single document reading processing time, and re-determining the maximum compression rate at which the transfer time of image data for one document P is unlikely to exceed the document reading processing time.

The controller 50 illustrated in FIG. 2 also executes the process executed in the first block, in the next two blocks. The controller continues the process with the compression rate of the image file following the transfer rate of the network NW at that time. That is, the controller 50 illustrated in FIG. 2 executes the compression rate re-determination process of determining the compression rate of an image file in the image generation process for the next block with the result, based on the transfer rate of the network NW to the external terminal 80 in the previous block and the reading rate of the reading section 40 illustrated in FIG. 2. Therefore, even when the transfer rate of the network NW to the external terminal 80 changes, the controller 50 can feed the change of the transfer rate back to the compression rate to be used the next. Even when the transfer rate of the network NW to the external terminal 80 normally changes, the controller 50 can follow the change of the transfer rate and feed the change back to the compression rate of the image file to be transferred the next.

The effects in the second embodiment will be described.

(10) The controller 50 executes the compression rate determination process of determining the compression rate of the second image file in the image generation process based on the transfer rate of the network NW when the first image file is transferred to the external terminal 80 and the reading rate of the reading section 40. Thus, the controller 50 reduces the possibility that the reading rate of the reading section 40 in the image reading apparatus 11 is slower than the transfer rate to the external terminal 80, and thus it is possible to provide a comfortable processing rate and to suppress deterioration of image quality of the transferred image file.

(11) The controller 50 executes the compression rate determination process based on the result obtained by executing the transfer rate diagnosis process of designating the image quality setting and the output destination, and calculating the transfer rate of the network NW to the external terminal 80, based on the transfer time when the transmitter 60 transfers the first image file to the external terminal 80 including the output destination. Therefore, the controller 50 obtains an appropriate compression rate based on the execution result of the transfer rate diagnosis process, and thus reduces the possibility that the reading rate of the reading section 40 in the image reading apparatus 11 is slower than the transfer rate to the external terminal 80. Accordingly, it is possible to provide a comfortable processing rate and to appropriately suppress deterioration of image quality of the transferred image file.

(12) Since the image quality setting and the output destination are designated with the input section 24, it is possible to determine the compression rate in accordance with setting of a job actually performed when the controller 50 executes the compression rate determination process.

(13) The controller 50 compresses an image file to be transferred, at the compression rate determined by the transfer rate diagnosis process and the compression rate determination process for the previously-transferred image file, transfers the compressed image file, and executes the transfer rate re-diagnosis process and the compression rate re-determination process for the image file. Thus, even when the transfer rate of the network NW to the external terminal 80 changes, the controller 50 can feed the change of the transfer rate back to the compression rate to be used the next. Therefore, it is possible to reduce the possibility that the reading rate of the reading section 40 in the image reading apparatus is slower than the transfer rate to the external terminal 80, and thus it is possible to provide a comfortable processing rate and to suppress deterioration of image quality of the transferred image file.

(14) The controller 50 compresses an image file to be transferred, at the compression rate determined by the transfer rate diagnosis process and the compression rate determination process for the image file which was transferred previously or immediately before, transfers the compressed image file, and executes the transfer rate re-diagnosis process and the compression rate re-determination process for the image file. Thus, even when the transfer rate of the network NW to the external terminal 80 normally changes, the controller 50 can follow the change of the transfer rate and feed the change back to the compression rate of the image file to be transferred the next. Therefore, it is possible to reduce the possibility that the reading rate of the reading section 40 in the image reading apparatus 11 is slower than the transfer rate to the external terminal 80, and thus it is possible to provide a comfortable processing rate and to suppress deterioration of image quality of the transferred image file.

(15) An image file in which the compression rate determination process is first executed is the dummy data. The controller 50 starts the transfer before or during the start of reading of the document P having an image of an image file to be transferred. Then, the controller executes the transfer rate re-diagnosis process and the compression rate re-determination process for the image file. Thus, it is possible to reduce the processing time. Further, even when the transfer rate of the network NW to the external terminal 80 normally changes, the controller 50 can follow the change of the transfer rate and feed the change back to the compression rate of the image file to be transferred first. Therefore, it is possible to reduce the possibility that the reading rate of the reading section 40 in the image reading apparatus 11 is slower than the transfer rate to the external terminal 80, and thus it is possible to provide a comfortable processing rate and to suppress deterioration of image quality of the transferred image file.

(16) In the image reading system 100, it is possible to obtain the same effects as those of the image reading apparatus 11 described in (10) to (15) above.

(17) In the image reading method of the image reading apparatus 11, it is possible to obtain the same effects as those of the image reading apparatus 11 described in (10) to (15) above.

The second embodiment can be changed and implemented as follows. The second embodiment and the following modification examples can be implemented in combination with each other in a range without the technical contradiction.

The output destination may be a folder of the external terminal 80, an output device such as a printer connected to the external terminal 80, or an output device as the external terminal 80, such as a printer, which is directly linked to the network.

Regarding the transfer time to the output destination of the external terminal 80 and the transfer rate of the network NW to the external terminal 80, information of the transfer time and the transfer rate may be obtained from another external terminal 80 or another image reading apparatus by the image reading apparatus 11, or the image reading apparatus 11 may share the information with another external terminal 80 or another image reading apparatus.

The operation section 20 may be a PC connected to the image reading apparatus 11 or a PC directly linked to the network NW.

The display section 70 may be a PC connected to the image reading apparatus 11 or a PC directly linked to the network NW.

The controller 50 may cause the user to select whether to designate the compression rate and execute the image generation process, to execute only the compression rate determination process without executing the transfer rate diagnosis process, or to execute the transfer rate diagnosis process and the compression rate determination process.

When the controller 50 automatically calculates the compression rate, the calculation result may be displayed on a display screen. In this case, when the compression rate is significantly different from the expectation of the user, the user may be able to interrupt the job with the input section 24. Even though the user does not interrupt the job at that time, it is possible to determine of performing the job again while avoiding the busy time slot of the network NW.

In the second embodiment, the transfer rate diagnosis process and the compression rate determination process, or the transfer rate re-diagnosis process and the compression rate re-determination process may be executed by the controller 50 in units of one image file. As in this embodiment, the above processes may be executed in units of a plurality of image files. That is, the controller 50 may determine the compression rate based on the transfer rate and the reading rate of one image file, or determine the compression rate based on the transfer rate and the reading rate of a plurality of image files. The transfer rate diagnosis process and the compression rate determination process, or the transfer rate re-diagnosis process and the compression rate re-determination process, which are executed in units of a plurality of image files, are equivalent to the processes executed in the document block unit in the second embodiment.

In the second embodiment, after the controller 50 executes the document block reading process a plurality of times, when the job setting is for a double-sided document and there are many documents having one side of the document P, which is blank, the controller 50 may set the compression rate to be high in consideration of the above description. When one side of the document P is blank, the amount of data transferred per document P is halved. Thus, the transfer time is reduced even though the compression rate is set to be high. Therefore, even though the compression rate is set to be high, there is little possibility that the transfer time is affected.

The technical idea, and the operation and effects grasped from the above-described embodiments and modification examples will be described below.

(A) An image reading apparatus is configured to be connected to an external terminal via a network. The image reading apparatus includes a transmitter that transfers data to the external terminal, a reading section that reads a document, and a controller that executes an image generation process of generating a single first image file from image data of the document read by the reading section, and causes the transmitter to transfer the first image file to the external terminal connected via the network. The controller executes a compression rate determination process of determining a compression rate of a second image file in the image generation process, based on a transfer rate of the network when the first image file is transferred to the external terminal and a reading rate of the reading section.

According to this configuration, the controller executes the compression rate determination process of determining the compression rate of the image file in the image generation process based on the transfer rate of the network to the external terminal and the reading rate of the reading section. Therefore, the controller reduces the possibility that the reading rate of the reading section in the image reading apparatus is slower than the transfer rate to the external terminal, and thus it is possible to provide a comfortable processing rate and to suppress deterioration of image quality of the transferred image file.

(B) In the image reading apparatus, the controller may execute the transfer rate diagnosis process of designating an image quality setting and an output destination, and calculating the transfer rate of the network to the external terminal based on a transfer time measured when the transmitter transfers the first image file to the external terminal including the output destination, and the controller may execute the compression rate determination process based on the transfer rate and the reading rate of the reading section.

According to this configuration, the controller executes the compression rate determination process based on the result obtained by executing the transfer rate diagnosis process of designating the image quality setting and the output destination, and calculating the transfer rate of the network to the external terminal, based on the transfer time when the transmitter transfers the first image file to the external terminal including the output destination. Therefore, the controller obtains an appropriate compression rate based on the execution result of the transfer rate diagnosis process, and thus reduces the possibility that the reading rate of the reading section in the image reading apparatus is slower than the transfer rate to the external terminal. Accordingly, it is possible to provide a comfortable processing rate and to appropriately suppress deterioration of image quality of the transferred image file.

(C) The image reading apparatus may further include the input section capable of designating the image quality setting and the output destination in the transfer rate diagnosis process.

According to this configuration, since the image quality setting and the output destination are designated with the input section, it is possible to determine the compression rate in accordance with setting of a job actually performed when the controller executes the compression rate determination process.

(D) In the image reading apparatus, the input section may be capable of selecting whether the compression rate is designated to execute the image generation process or to execute the transfer rate diagnosis process and the compression rate determination process.

According to this configuration, when the controller already has information on the appropriate compression rate, the controller selects the compression rate to execute the image generation process. Thus, it is possible to reduce an occurrence of a situation in which the reading rate of the reading section in the image reading apparatus becomes slower than the transfer rate to the external terminal in a short processing time. In addition, it is possible to provide a comfortable processing rate and to appropriately suppress deterioration of image quality of the transferred image file. In addition, since the controller executes the transfer rate diagnosis process and the compression rate determination process, and then executes the image generation process, it is possible to select the more appropriate compression rate in accordance with the situation at this time. It is possible to reduce an occurrence of a situation in which the reading rate of the reading section in the image reading apparatus becomes slower than the transfer rate to the external terminal in a short processing time. In addition, it is possible to provide a comfortable processing rate and to appropriately suppress deterioration of image quality of the transferred image file.

(E) In the image reading apparatus, the controller may cause the transmitter to transfer the second image file to the output destination, the second image file being compressed at the compression rate determined by the transfer rate diagnosis process for the first image file and the compression rate determination process. The controller may execute the transfer rate re-diagnosis process of calculating the transfer rate of the network to the external terminal based on the transfer time when the transmitter transfers the second image file to the external terminal including the output destination. The controller may execute a compression rate re-determination process of a third image file in the image generation process, based on the transfer rate and the reading rate of the reading section.

According to this configuration, the controller compresses an image file to be transferred, at the compression rate determined by the transfer rate diagnosis process and the compression rate determination process for the previously-transferred image file, transfers the compressed image file, and executes the transfer rate re-diagnosis process and the compression rate re-determination process for the image file. Thus, even when the transfer rate of the network to the external terminal changes, the controller can feed the change of the transfer rate back to the compression rate to be used the next. Therefore, it is possible to reduce the possibility that the reading rate of the reading section in the image reading apparatus is slower than the transfer rate to the external terminal, and thus it is possible to provide a comfortable processing rate and to suppress deterioration of image quality of the transferred image file.

(F) In the image reading apparatus, the second image file may be subjected to the compression rate re-determination process before the transmitter transfers the third image file to the output destination.

According to this configuration, the controller compresses an image file to be transferred, at the compression rate determined by the transfer rate diagnosis process and the compression rate determination process for the image file which was transferred previously or immediately before, transfers the compressed image file, and executes the transfer rate re-diagnosis process and the compression rate re-determination process for the image file. Thus, even when the transfer rate of the network to the external terminal normally changes, the controller can follow the change of the transfer rate and feed the change back to the compression rate of the image file to be transferred the next. Therefore, it is possible to reduce the possibility that the reading rate of the reading section in the image reading apparatus is slower than the transfer rate to the external terminal, and thus it is possible to provide a comfortable processing rate and to suppress deterioration of image quality of the transferred image file.

(G) In the image reading apparatus, the first image file may be dummy data.

According to this configuration, the controller starts the transfer before or during the start of reading of the document having an image of an image file to be transferred. Then, the controller executes the transfer rate re-diagnosis process and the compression rate re-determination process for the image file. Thus, it is possible to reduce the processing time. Further, even when the transfer rate of the network to the external terminal normally changes, the controller can follow the change of the transfer rate and feed the change back to the compression rate of the image file to be transferred first. Therefore, it is possible to reduce the possibility that the reading rate of the reading section in the image reading apparatus is slower than the transfer rate to the external terminal, and thus it is possible to provide a comfortable processing rate and to suppress deterioration of image quality of the transferred image file.

(H) The image reading apparatus may further include the display section that displays the result of the transfer rate diagnosis process when the transfer rate diagnosis process is ended.

According to this configuration, the user can execute the next compression rate determination process to be executed the next time, after confirming the result of the transfer rate diagnosis process. The user can determine whether the user determines the compression rate, or determine whether a job needs to be performed again, in accordance with the result of the transfer rate diagnosis process. Therefore, it is possible to reduce the possibility that the reading rate of the reading section in the image reading apparatus is slower than the transfer rate to the external terminal, and thus it is possible to provide a comfortable processing rate and to suppress deterioration of image quality of the transferred image file.

(I) In the image reading apparatus, the display section may display the compression rate used for the image generation process when the image quality setting and the output destination are designated.

According to this configuration, the user can check whether the displayed compression rate has a desired value. When the displayed compression rate does not have a desired value, the user can change the designation of the image quality setting or the output destination. Therefore, it is possible to reduce the possibility that the reading rate of the reading section in the image reading apparatus is slower than the transfer rate to the external terminal, and thus it is possible to provide a comfortable processing rate and to suppress deterioration of image quality of the transferred image file.

(J) In the image reading apparatus, the display section may display an image configured such that the compression rate and the image quality of the first image file are recognized when the first image file is transferred to the output destination based on the compression rate determined by the compression rate determination process.

According to this configuration, the user can check whether the image quality of the transferred image file is the desired image quality. Then, when the image quality of the displayed image file is not the desired image quality, the user can change the job setting to perform the job again. Therefore, it is possible to reduce the possibility that the reading rate of the reading section in the image reading apparatus is slower than the transfer rate to the external terminal, and thus it is possible to provide a comfortable processing rate and to suppress deterioration of image quality of the transferred image file.

(K) An image reading system includes an image reading apparatus that executes an image generation process of generating a single first image file by reading a document, and an external terminal connected to the image reading apparatus via a network. A compression rate determination process of determining a compression rate of a second image file in the image generation process, based on a transfer rate of the network when the first image file is transferred to the external terminal, and a reading rate of a reading section.

According to this configuration, it is possible to obtain the same effects as those in the image reading apparatus (A) described above.

(L) In the image reading system, the transfer rate diagnosis process of designating an image quality setting and an output destination, and calculating the transfer rate of the network to the external terminal including the output destination based on a transfer time when the image reading apparatus transfers the first image file to the external terminal including the output destination may be executed. The input section capable of designating the image quality setting and the output destination in the transfer rate diagnosis process and the display section capable of displaying a result of the transfer rate diagnosis process may be provided.

According to this configuration, it is possible to obtain the same effects as those in the image reading apparatuses (B), (C), and (H) described above.

(M) There is provided an image reading method of an image reading apparatus including a reading section that reads a document, a transmitter that transfers data to an external terminal connected via a network, and a controller that controls the reading section and the transmitter. The image reading method includes an image generation process step of generating a single first image file from image data obtained by the reading section reading a document, a transfer step of transferring the first image file to the external terminal connected via the network by the transmitter, and a compression rate determination process step of determining a compression rate of a second image file in the image generation process step based on a transfer rate of the network when the first image file is transferred to the external terminal and a reading rate of the reading section.

According to this method, it is possible to obtain the same effects as those in the image reading apparatus (A) described above.

What is claimed is:

1. An image reading apparatus configured to be connected to an external terminal via a network, the apparatus comprising:
    a transmitter that transfers data to the external terminal;
    a reading section that reads a document; and
    a controller that executes an image generation process of generating a single first image file from image data of the document read by the reading section, and causes the transmitter to transfer the first image file to the external terminal connected via the network, wherein
    the controller executes a compression rate determination process of determining a compression rate of a second image file in the image generation process, based on a transfer rate of the network when the first image file is transferred to the external terminal and a reading rate of the reading section.

2. The image reading apparatus according to claim 1, wherein
    the controller executes a transfer rate diagnosis process of designating an image quality setting and an output destination, and calculating the transfer rate of the network to the external terminal based on a transfer time measured when the transmitter transfers the first image file to the external terminal including the output destination, and
    the controller executes the compression rate determination process based on the transfer rate and the reading rate of the reading section.

3. The image reading apparatus according to claim 2, further comprising:
    an input section configured to designate the image quality setting and the output destination in the transfer rate diagnosis process.

4. The image reading apparatus according to claim 3, wherein
    the input section is configured to select whether the compression rate is designated to execute the image generation process or to execute the transfer rate diagnosis process and the compression rate determination process.

5. The image reading apparatus according to claim 2, wherein
    the controller causes the transmitter to transfer the second image file to the output destination, the second image file being compressed at the compression rate determined by the transfer rate diagnosis process for the first image file and the compression rate determination process,
    the controller executes a transfer rate re-diagnosis process of calculating the transfer rate of the network to the external terminal based on a transfer time when the transmitter transfers the second image file to the external terminal including the output destination, and
    the controller executes a compression rate re-determination process of a third image file in the image generation process, based on the transfer rate and the reading rate of the reading section.

6. The image reading apparatus according to claim 5, wherein
    the second image file is subjected to the compression rate re-determination process before the transmitter transfers the third image file to the output destination.

7. The image reading apparatus according to claim 2, wherein
    the first image file is dummy data.

8. The image reading apparatus according to claim 2, further comprising:
    a display section that displays a result of the transfer rate diagnosis process when the transfer rate diagnosis process is ended.

9. The image reading apparatus according to claim 8, wherein
    the display section displays the compression rate used for the image generation process when the image quality setting and the output destination are designated.

10. The image reading apparatus according to claim 8, wherein
    the display section displays an image such that the compression rate and the image quality of the first image file are recognized when the first image file is transferred to the output destination based on the compression rate determined by the compression rate determination process.

11. An image reading system comprising:
    an image reading apparatus that executes an image generation process of generating a single first image file by reading a document; and
    an external terminal that is connected to the image reading apparatus via a network, wherein
    a compression rate determination process of determining a compression rate of a second image file in the image generation process based on a transfer rate of the network when the first image file is transferred to the external terminal and a reading rate of a reading section is executed.

12. The image reading system according to claim 11, wherein
    a transfer rate diagnosis process of designating an image quality setting and an output destination, and calculating the transfer rate of the network to the external terminal including the output destination based on a transfer time when the image reading apparatus transfers the first image file to the external terminal including the output destination is executed, and
    an input section configured to designate the image quality setting and the output destination in the transfer rate diagnosis process and a display section configured to display a result of the transfer rate diagnosis process are provided.

13. An image reading method of an image reading apparatus including a reading section that reads a document, a transmitter that transfers data to an external terminal connected via a network, and a controller that controls the reading section and the transmitter, the method comprising:
- an image generation process step of generating a single first image file from image data obtained by the reading section reading a document;
- a transfer step of transferring the first image file to the external terminal connected via the network by the transmitter; and
- a compression rate determination process step of determining a compression rate of a second image file in the image generation process step, based on a transfer rate of the network when the first image file is transferred to the external terminal and a reading rate of the reading section.

* * * * *